(12) United States Patent
Ge et al.

(10) Patent No.: US 11,908,239 B2
(45) Date of Patent: Feb. 20, 2024

(54) IMAGE RECOGNITION NETWORK MODEL TRAINING METHOD, IMAGE RECOGNITION METHOD AND APPARATUS

(71) Applicant: TENCENT TECHNOLOGY (SHENZHEN) COMPANY LIMITED, Guangdong (CN)

(72) Inventors: Zheng Ge, Shenzhen (CN); Ze Qun Jie, Shenzhen (CN); Hao Wang, Shenzhen (CN); Zhi Feng Li, Shenzhen (CN); Di Hong Gong, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 470 days.

(21) Appl. No.: 17/319,452

(22) Filed: May 13, 2021

(65) Prior Publication Data

US 2021/0264205 A1    Aug. 26, 2021

Related U.S. Application Data

(63) Continuation of application No. PCT/CN2020/080002, filed on Mar. 18, 2020.

(30) Foreign Application Priority Data

Apr. 2, 2019    (CN) .......................... 201910262855.4

(51) Int. Cl.
*G06K 9/62* (2022.01)
*G06K 9/00* (2022.01)
(Continued)

(52) U.S. Cl.
CPC .......... *G06V 40/172* (2022.01); *G06F 18/214* (2023.01); *G06F 18/2415* (2023.01);
(Continued)

(58) Field of Classification Search
CPC .... G06V 40/172; G06V 10/82; G06V 10/774; G06F 18/214; G06F 18/2415; G06N 3/045; G06N 3/088
See application file for complete search history.

(56) References Cited

U.S. PATENT DOCUMENTS

| 9,323,980 B2 * | 4/2016 | Sun ..................... G06V 40/172 |
| 2012/0288167 A1 * | 11/2012 | Sun ........................ G06V 40/16 |
| | | 382/118 |
| 2018/0268055 A1 | 9/2018 | Yu et al. |

FOREIGN PATENT DOCUMENTS

| CN | 107437077 A | 12/2017 |
| CN | 109190475 A | 1/2019 |

(Continued)

OTHER PUBLICATIONS

International Search Report for PCT/CN2020/080002 dated May 25, 2020 [PCT/ISA/210].

(Continued)

*Primary Examiner* — Bobbak Safaipour
*Assistant Examiner* — Jongbong Nah
(74) *Attorney, Agent, or Firm* — Sughrue Mion, PLLC

(57) ABSTRACT

The disclosure provides an image recognition network model training method, including: acquiring a first image feature corresponding to an image set; acquiring a first identity prediction result by using an identity classifier, and acquiring a first pose prediction result by using a pose classifier; obtaining an identity classifier according to the first identity prediction result and an identity tag, and obtaining a pose classifier according to the first pose prediction result and a pose tag; performing pose transformation on the first image feature by using a generator, to obtain a second image feature corresponding to the image set; acquiring a second identity prediction result by using the (Continued)

identity classifier, and acquiring a second pose prediction result by using the pose classifier; and training the generator.

18 Claims, 15 Drawing Sheets

(51) Int. Cl.
*G06V 40/16* (2022.01)
*G06F 18/214* (2023.01)
*G06F 18/2415* (2023.01)
*G06V 10/774* (2022.01)
*G06V 10/82* (2022.01)
*G06N 3/088* (2023.01)
*G06N 3/045* (2023.01)

(52) U.S. Cl.
CPC ............ *G06V 10/774* (2022.01); *G06V 10/82* (2022.01); *G06N 3/045* (2023.01); *G06N 3/088* (2013.01)

(56) References Cited

FOREIGN PATENT DOCUMENTS

| | | |
|---|---|---|
| CN | 110163082 A | 8/2019 |
| WO | 2019/056000 A1 | 3/2019 |
| WO | WO-2019056000 A1 * | 3/2019 ........... G06F 18/214 |

OTHER PUBLICATIONS

Written Opinion for PCT/CN2020/080002 dated May 25, 2020 [PCT/ISA/237].

Extended European Search Report dated Apr. 25, 2022 in European Application No. 20784955.5.

English Translation of the Written Opinion of the International Searching Authority dated May 25, 2020 in International Application No. PCT/CN2020/080002.

* cited by examiner

IMAGE RECOGNITION NETWORK MODEL TRAINING METHOD, IMAGE RECOGNITION METHOD AND APPARATUS

CROSS-REFERENCE TO RELATED APPLICATION(S)

This application is a bypass continuation application of International Application No. PCT/CN2020/080002, filed Mar. 18, 2020 and entitled "IMAGE RECOGNITION NETWORK MODEL TRAINING METHOD, IMAGE RECOGNITION METHOD AND DEVICE", which claims priority to Chinese Patent Application No. 201910262855.4, filed on Apr. 2, 2019 and entitled "IMAGE RECOGNITION NETWORK MODEL TRAINING METHOD, IMAGE RECOGNITION METHOD AND APPARATUS", the disclosures of which are herein incorporated by reference in their entireties.

FIELD

The disclosure relates to the field of artificial intelligence, and in particular, to an apparatus and a method for training an image recognition network model, and an apparatus and a method for image recognition.

BACKGROUND

With the rapid development of face recognition technologies, face recognition is applied to many aspects including security monitoring, and the like. Profile recognition is very important in face recognition. In many cases, it is difficult to obtain a frontal face image of a person. For example, a probability of capturing a frontal face of a person in a surveillance scenario is relatively low. Therefore, there is a very critical technical problem that needs to be resolved in face recognition to improve the accuracy of profile recognition.

At present, a method for detecting a profile image is to first obtain a generative adversarial network (GAN) model through training, then input the profile image into the GAN model, and perform face frontalization with space identity invariance on the profile image by using the GAN model, to obtain a frontalized face image. Finally, the face image is inputted to a neural network for recognition.

However, the related art method performs face frontalization based on an original profile image, that is, frontalizing an original image space. Since the original image space is not organized, for example, an original image is 128 long and 128 wide, that is, the space is of a size of 3×128×128, a large neural network is required to train the original image space. This process requires a large amount of computation, thereby increasing the difficulty of training and the complexity of the model, and requires a large amount of computing resources.

SUMMARY

Embodiments of the disclosure provide an image recognition network model training method, an image recognition network model training apparatus, an image recognition method, and an image recognition apparatus. Training is performed based only on image features, and the image features are organized. Therefore, spatial dimensions are relatively smaller compared to original images, thereby reducing the difficulty of training and the complexity of the model, and reducing the consumption of computing resources.

In accordance with an aspect of an example embodiment of the disclosure, an image recognition network model training method performed by a computer device is provided, the method including:

acquiring a first image feature corresponding to an image set, the image set including at least one image, an image of the at least one image having an identity tag and a pose tag, the identity tag representing identity information of a target object in the image, and the pose tag representing pose information of the target object in the image;

acquiring, by using an identity classifier, a first identity prediction result corresponding to the first image feature, and acquiring, by using a pose classifier, a first pose prediction result corresponding to the first image feature;

training the identity classifier according to the first identity prediction result and the identity tag, and training the pose classifier according to the first pose prediction result and the pose tag;

performing pose transformation on the first image feature by using a generator, to obtain a second image feature corresponding to the image set, the second image feature being corresponding to a target pose;

acquiring, by using the identity classifier, a second identity prediction result corresponding to the second image feature, and acquiring, by using the pose classifier, a second pose prediction result corresponding to the second image feature; and training the generator according to the second identity prediction result, the identity tag, the second pose prediction result, a target pose tag, the second image feature, and a third image feature, the third image feature being an image feature corresponding to an image belonging to the target pose in the image set, the target pose tag representing information of the target pose, and the generator being configured to generate an image recognition network model.

In accordance with an aspect of an example embodiment of the disclosure, an image recognition method performed by a computer device is provided, the method including:

acquiring a first image, the first image including a first target object, and the first target object being corresponding to first pose information;

acquiring, by using a generator in an image recognition network model, a second image corresponding to the first image, the second image including a second target object, the second target object being corresponding to second pose information, and the generator being configured to perform pose transformation on an object in an image; and determining an identity recognition result of the second image by using a recognition module in the image recognition network model.

In accordance with an aspect of an example embodiment of the disclosure, a face pose transformation method performed by a computer device is provided, the method including:

acquiring an image, the image being corresponding to first pose information, the first pose information representing pose information of the image before frontalization; and transforming the image by using a generator, to obtain a frontalized face image corresponding to the image, the frontalized face image being corresponding to second pose information, the second pose information representing pose information of the image after frontalization, and the generator being configured to perform pose transformation on an object in an image.

In accordance with an aspect of an example embodiment of the disclosure, a model training apparatus is provided, including:

at least one memory configured to store program code; and at least one processor configured to read the program code and operate as instructed by the program code, the program code comprising:

first acquisition code configured to cause at least one of the at least one processor to acquire a first image feature corresponding to an image set, the image set including at least one image, an image of the at least one image having an identity tag and a pose tag, the identity tag representing identity information of a target object in the image, and the pose tag representing pose information of the target object in the image;

second acquisition code configured to cause at least one of the at least one processor to acquire, by using an identity classifier, a first identity prediction result corresponding to the first image feature, and acquire, by using a pose classifier, a first pose prediction result corresponding to the first image feature;

first training code configured to cause at least one of the at least one processor to train the identity classifier according to the first identity prediction result acquired by the acquisition module and the identity tag, and train the pose classifier according to the first pose prediction result acquired by the acquisition module and the pose tag;

transformation code configured to cause at least one of the at least one processor to perform, by using a generator, pose transformation on the first image feature acquired by the acquisition module, to obtain a second image feature corresponding to the image set, the second image feature being corresponding to a target pose;

third acquisition code configured to cause at least one of the at least one processor to acquire, by using the identity classifier obtained by training by the training module, a second identity prediction result corresponding to the second image feature, and acquire, by using the pose classifier obtained by training by the training module, a second pose prediction result corresponding to the second image feature; and second training code configured to cause at least one of the at least one processor to train the generator according to the second identity prediction result acquired by the acquisition module, the identity tag, the second pose prediction result, a target pose tag, the second image feature, and a third image feature, the third image feature being an image feature corresponding to an image belonging to the target pose in the image set, the target pose tag representing information of the target pose, and the generator being configured to generate an image recognition network model.

In accordance with an aspect of an example embodiment of the disclosure, an image recognition apparatus is provided, including:

at least one memory configured to store program code; and at least one processor configured to read the program code and operate as instructed by the program code, the program code comprising:

acquisition code configured to cause at least one of the at least one processor to acquire a first image, the first image including a first target object, and the first target object being corresponding to first pose information;

acquisition code configured to cause at least one of the at least one processor to acquire, by using a generator in an image recognition network model, a second image corresponding to the first image, the second image including a second target object, the second target object being corresponding to second pose information, and the generator being configured to perform pose transformation on an object in an image; and determination code configured to cause at least one of the at least one processor to determine, by using a recognition module in the image recognition network model, an identity recognition result of the second image acquired by the acquisition module.

In accordance with an aspect of an example embodiment of the disclosure, a face pose transformation apparatus is provided, including:

at least one memory configured to store program code; and at least one processor configured to read the program code and operate as instructed by the program code, the program code comprising:

acquisition code configured to cause at least one of the at least one processor to acquire an image, the image being corresponding to first pose information, the first pose information representing pose information of the image before frontalization; and processing code configured to cause at least one of the at least one processor to transform, by using a generator, the image acquired by the acquisition module, to obtain a frontalized face image corresponding to the image, the frontalized face image being corresponding to second pose information, the second pose information representing pose information of the image after frontalization, and the generator being configured to perform pose transformation on an object in an image.

In accordance with an aspect of an example embodiment of the disclosure, a computer device is provided, including a memory, a transceiver, a processor, and a bus system, the memory being configured to store a program;

the processor being configured to execute the program in the memory, to implement the foregoing image recognition network model training method, or implement the foregoing image recognition method, or implement the foregoing face pose transformation method; and the bus system being configured to connect the memory and the processor, to enable communication between the memory and the processor.

In accordance with an aspect of an example embodiment of the disclosure, a non-transitory computer-readable storage medium is provided. The computer-readable storage medium stores a program (or referred to as instructions). The program, when run on a processor of a computer device, causes the computer device to perform the methods in the foregoing aspects.

BRIEF DESCRIPTION OF THE DRAWINGS

Accompanying drawings herein are incorporated into the specification and constitute a part of this specification, show example embodiments that conform to the disclosure, and are used for describing a principle of the disclosure together with this specification. Apparently, the accompanying drawings described below are merely some embodiments of the disclosure, and a person of ordinary skill in the art may further obtain other accompanying drawings according to the accompanying drawings without creative efforts.

DETAILED DESCRIPTION

Figure 1:
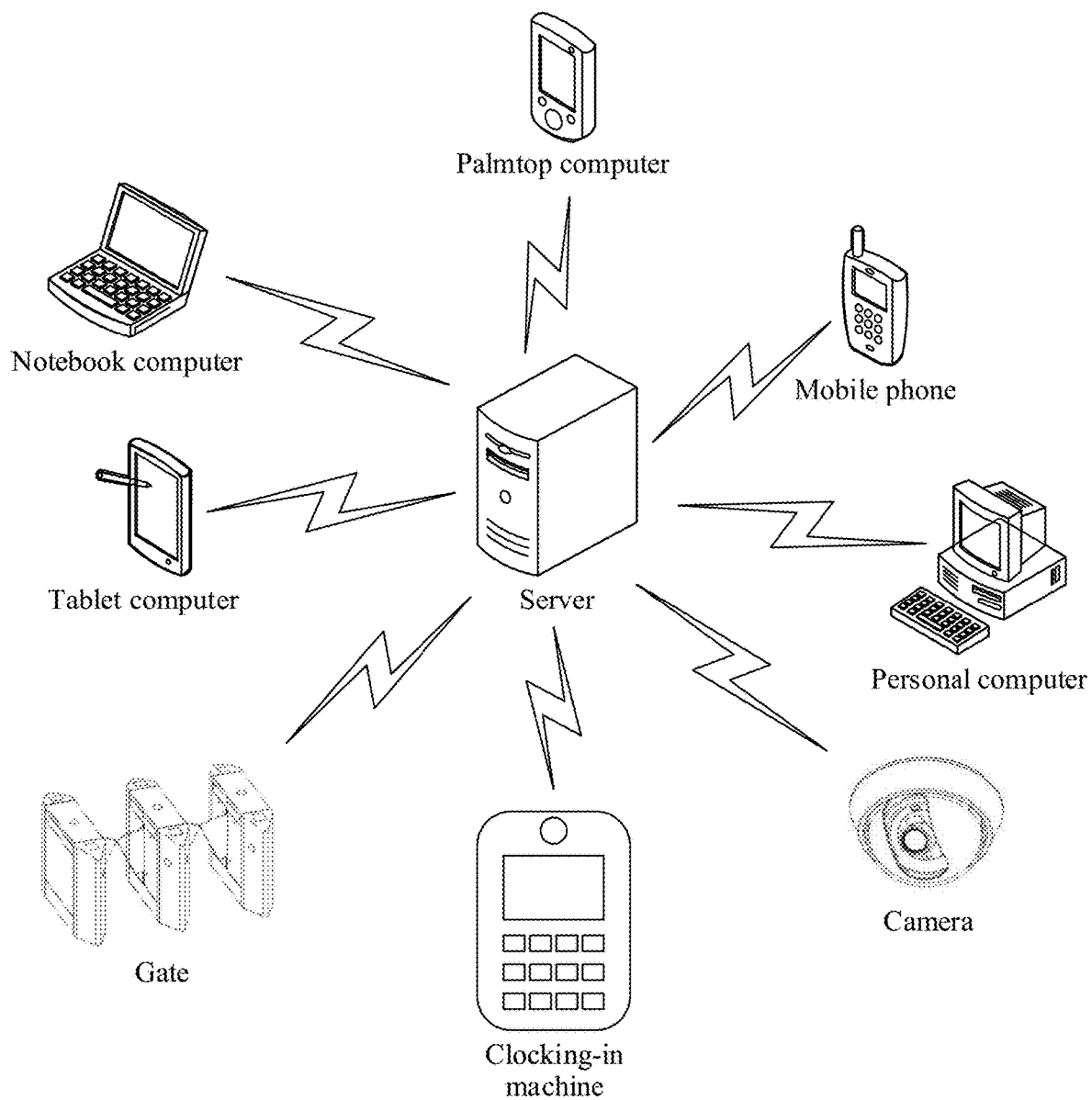
FIG. 1 is a schematic architectural diagram of an image recognition system according to an embodiment of the disclosure.

Example embodiments of the disclosure provide an image recognition network model training method and apparatus, and an image recognition method and apparatus. Training is performed based only on image features, and the image features are organized. Therefore, spatial dimensions are relatively smaller compared to original images, thereby reducing the difficulty of training and the complexity of the model, and reducing the consumption of computing resources.

Terms such as "first", "second", "third", and "fourth" (if any) in the specification, claims and foregoing drawings of the disclosure are intended only to distinguish similar objects, and are not intended to describe a specific order or sequence. It is to be understood that data used in this way may be interchanged in an appropriate case, so that the embodiments of the disclosure described herein may be implemented in a sequence other than those illustrated or described herein. In addition, the terms "include/comprise", "correspond to", and any variant thereof intend to cover a non-exclusive inclusion. For example, a process, a method, a system, a product, or a device including a series of operations or units is not necessarily limited to the operations or units expressly listed, but may also include other operations or units not expressly listed or inherent to the process, method, product, or device.

It is to be understood that the disclosure is applied to the field of artificial intelligence, specifically to image recognition scenarios in the field of artificial intelligence, and more specifically to the field of face-related technologies such as face recognition scenarios and detection and tracking scenarios. In actual applications of the disclosure, a plurality of interference factors such as poses, glasses, expressions, and shadows are ubiquitous, and affect a recognition effect to varying degrees. Among the factors, the problem of profile recognition caused by changes in the poses is particularly significant. Frontalization (that is, obtaining a frontal view) on a face in an image is not only the basis of subsequent processing, but also has a wide range of application value in the fields of security and protection (for example, when an image of a suspect is acquired, the image may be frontalized to identify the suspect), finance (for example, a face image may be frontalized during payment, to identify a payer), attendance (for example, when a photo of an employee clocking in is acquired, the photo may be frontalized to identify the employee), and customs (for example, when a head image of a tourist is acquired, the head image may be frontalized to identify the tourist). The method provided in the disclosure may be deployed in a camera or a cloud server, which provides a profile recognition technology, relaxes position restrictions on a face recognition camera during placement, and makes face recognition under some various (e.g., extreme) body pose conditions possible. In addition, the method may be deployed in a mobile phone to be used for unlocking the mobile phone or making payments, thereby improving convenience and ease of use.

For ease of understanding, the disclosure provides an image recognition method. The method is applied to an image recognition system shown in FIG. 1. FIG. 1 is a schematic architectural diagram of an image recognition system according to an embodiment of the disclosure. As shown in the figure, the model training method provided in the disclosure is applicable to a server. An image recognition network model is obtained through training by the server. The image recognition network model may be deployed in a client or in a cloud server. If the image recognition network model is deployed in the client, the client may frontalize an image in an off-line state, and then recognize the frontalized image. If the image recognition network model is deployed in the cloud server, the client may transmit an image to the cloud server in an on-line state. The cloud server frontalizes the image, then recognizes the frontalized image, and finally may feed a recognition result back to the client.

The client may be deployed on a terminal device. The terminal device includes, but is not limited to, a tablet computer, a notebook computer, a palmtop computer, a mobile phone, a voice interaction device, a personal computer (PC), a gate, a clocking-in machine, and a camera, which is not limited herein. The voice interaction device includes, but is not limited to, a smart speaker and a smart home appliance.

In the process of model training, firstly, a conventional face recognition network is obtained through training by using a convolutional neural network (CNN), and then a trained face feature layer in the face recognition network is taken as an input of a GAN to generate a corrected feature with the same dimension as an original feature. The corrected feature is a feature expression of a face at any angle after frontalization. In a stage of training the GAN, a final classification layer of the face recognition network needs to be used to provide an identity invariant loss for new features. In addition, a final classification layer of a pre-trained face pose evaluation network also needs to be used for providing the new features with pose constraint information. Finally, to alleviate the problem of overfitting of the frontalized feature for a pose constraint and an identity constraint, an adversarial loss may also be added to the generated feature. A true input of a discriminator is a feature of a frontal face sample by using the face recognition network, and a false input is a frontalized feature of any sample after being corrected by a generator. Weights of an identity constraint loss, a pose constraint loss, and an adversarial constraint loss are adjusted, so that a frontalized face feature may achieve a better profile recognition effect than an original profile feature. Accordingly, the accuracy of profile recognition may be significantly improved, the performance of cameras in application scenarios such as face attendance and face gates may be greatly improved, in this case, restrictions on poses of a recognized person may be weakened, and the comfort in face clock-in, gate, payment, search, and the like using a face image in various scenarios may be enhanced.

Based on the foregoing description, a dataset used during the model training in the disclosure may be a multi pose, illumination, expressions (Multi-PIE) dataset, or a celebrity frontal-profile (CFP) dataset. However, in benchmarks disclosed based on pose invariant face recognition (PIFR), the datasets may be limited in a laboratory environment, or may include only a small amount of test images. Therefore, the images are insufficient to evaluate capabilities of different algorithms. In view of the foregoing problems, a celebrity pose face dataset (CPFD) is used in the disclosure. The CPFD is a million-level face dataset captured from a network engine, has large pose changes, and may be used for face verification and recognition with pose invariance. A face frontalization module is introduced in the disclosure to learn frontal representation in all facial (frontal and non-frontal) feature spaces. The frontal representation is referred to as adversarial feature frontalization (AFF).

Figure 2:
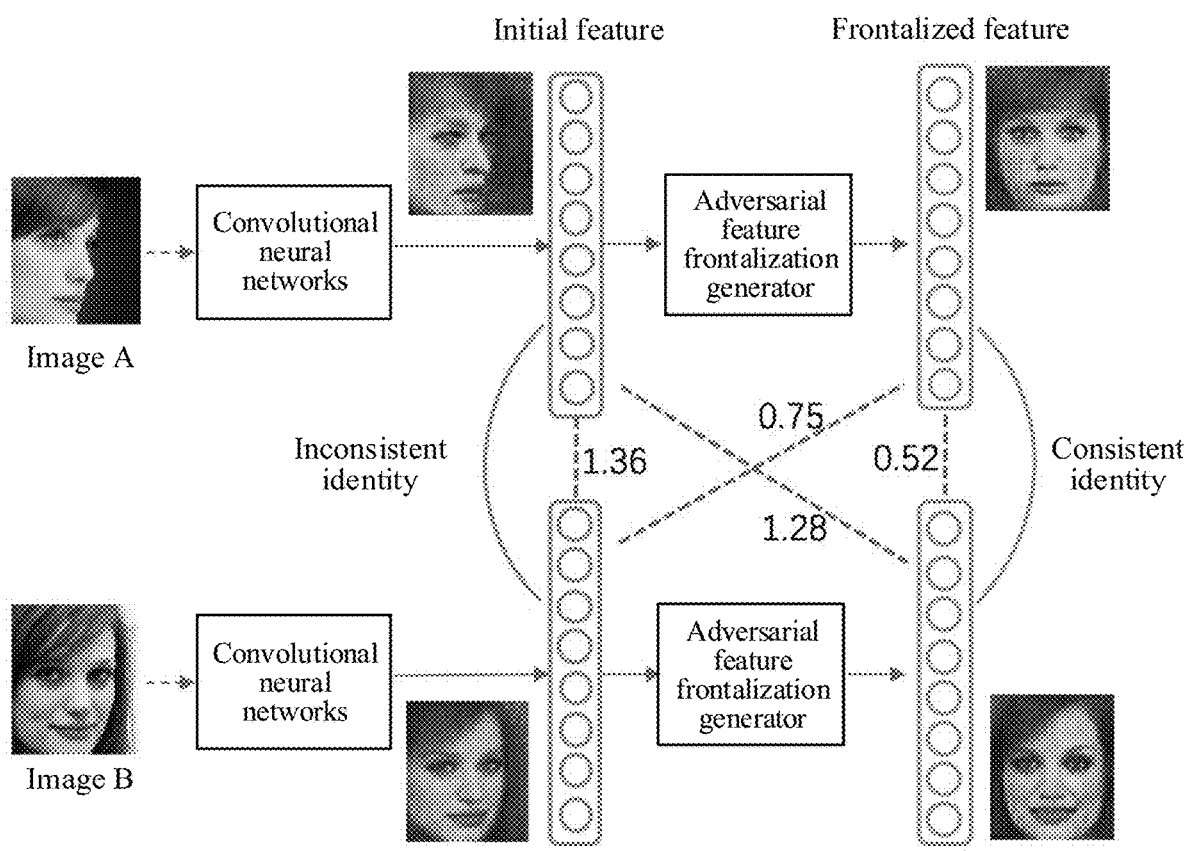
FIG. 2 is a schematic framework diagram of frontalizing a non-frontal image according to an embodiment of the disclosure.

For ease of description, FIG. 2 is a schematic framework diagram of frontalizing a non-frontal image according to an embodiment of the disclosure. As shown in the figure, images corresponding to two poses of a target object, which are respectively image A and image B, are acquired. Firstly, the image A and the image B are inputted to a feature extractor of a CNN. An initial feature of the image A and an initial feature of the image B are outputted by using a conventional face recognition network. The initial feature of the image A is compared with the initial feature of the image B to obtain that a Euclidean distance between the features is 1.36. Assuming that a threshold is 0.95, the Euclidean distance between the features of 1.36 is greater than the threshold of 0.95, which indicates that the identity of the image A and the identity of the image B that are recognized are inconsistent. The initial feature of the image A and the initial feature of the image B are inputted to an AFF generator obtained by training in the disclosure, to obtain a frontalized feature of the image A and a frontalized feature of the image B. That is, non-frontal features all become frontal features by using the AFF generator. The frontalized feature of the image A is compared with the frontalized feature of the image B, to obtain that a Euclidean distance between the features is 0.52, which is less than the threshold of 0.95, indicating that the identity of the image A and the identity of the image B that are recognized are consistent.

Figure 3:
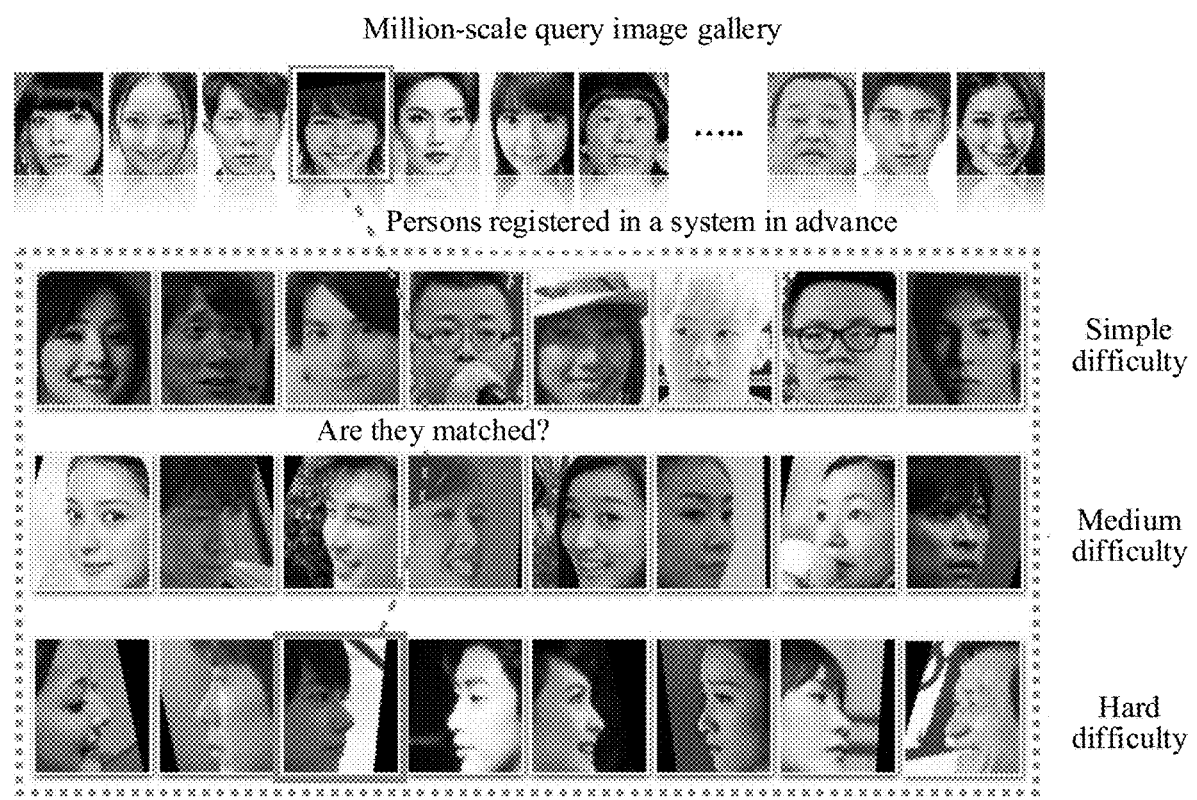
FIG. 3 is a schematic diagram of an example used for recognition based on a celebrity pose face dataset (CPFD) according to an embodiment of the disclosure.
Figure 4:
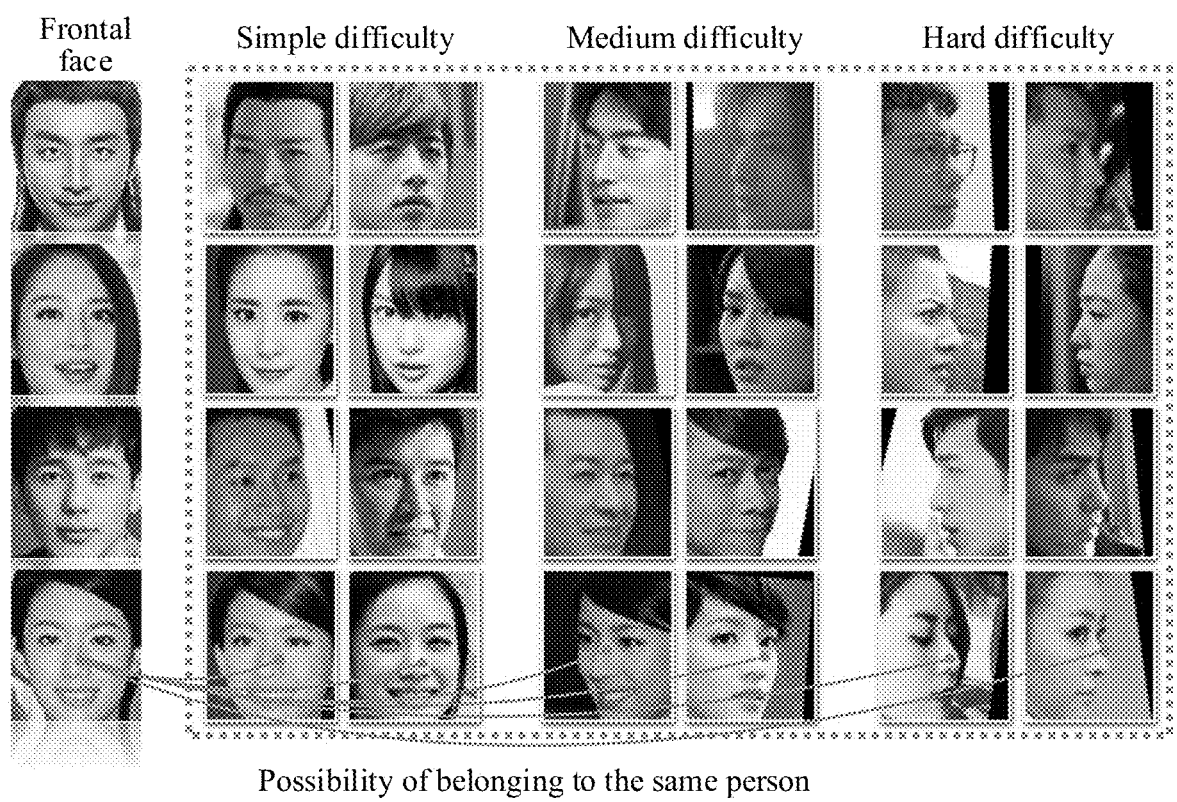
FIG. 4 is a schematic diagram of an example used for verification based on a CPFD according to an embodiment of the disclosure.

FIG. 3 is a schematic diagram of an example used for recognition based on a CPFD according to an embodiment of the disclosure. As shown in the figure, for each face registered in a system in advance, faces belonging to the same identity are found in a million-scale query image gallery. Taking a scenario of venue sign-in as an example, the query image gallery is used for querying face data collected during the venue sign-in, and collected faces are matched with the faces registered in the system in advance, to find faces with a minimum Euclidean distance and less than the threshold (such as 0.95) as a recognition result. In FIG. 3, simple difficulty indicates a case where a face yaw is small, medium difficulty indicates a case where the face yaw is slightly larger, and hard difficulty indicates a case where the face yaw is the largest. FIG. 4 is a schematic diagram of an example used for verification based on a CPFD according to an embodiment of the disclosure. As shown in the figure, during face image matching, firstly, face images with a yaw need to be frontalized to obtain frontal images, and then the frontal images are compared with face images at different difficulty levels to determine the possibility of belonging to the same person, which may be applied to scenarios such as unlocking a mobile phone. Therefore, the CPFD may improve the performance of face recognition algorithms in various scenarios.

Based on an existing PIFR test set scale and a CPFD scale, the disclosure provides a schematic comparison table, as illustratively shown in Table 1.

TABLE 1

| Benchmark | Image quantity | Verification pair (1:1) | Images in an image gallery (1:N) |
| --- | --- | --- | --- |
| Multi-PIE dataset | 149,400 | — | 99 |
| CFP dataset | 7,000 | 7,000 | — |
| CPFD | 886,577 | 137,196 | 1,000,000 |

It can be seen from Table 1 that the CPFD used in the disclosure has a better evaluation benchmark and includes more image data than the PIFR test set, thereby enhancing the generalization capability of the CPFD. The quantity of images in the CPFD is 886,577, which is much larger than an existing benchmark. The quantity of verification pairs and the quantity of images in the image gallery are also larger, which is conducive to open training.

Figure 5:
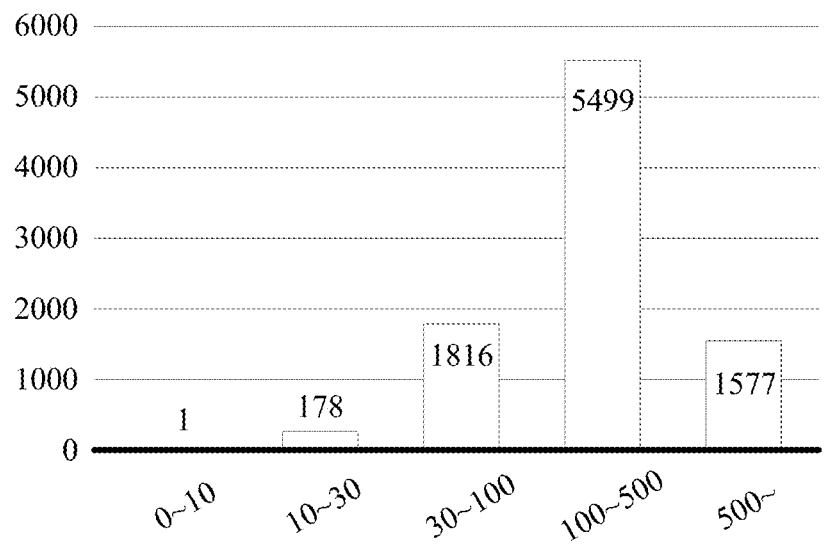
FIG. 5 is a schematic diagram of statistical distribution of personal photos based on a CPFD according to an embodiment of the disclosure.
Figure 6:
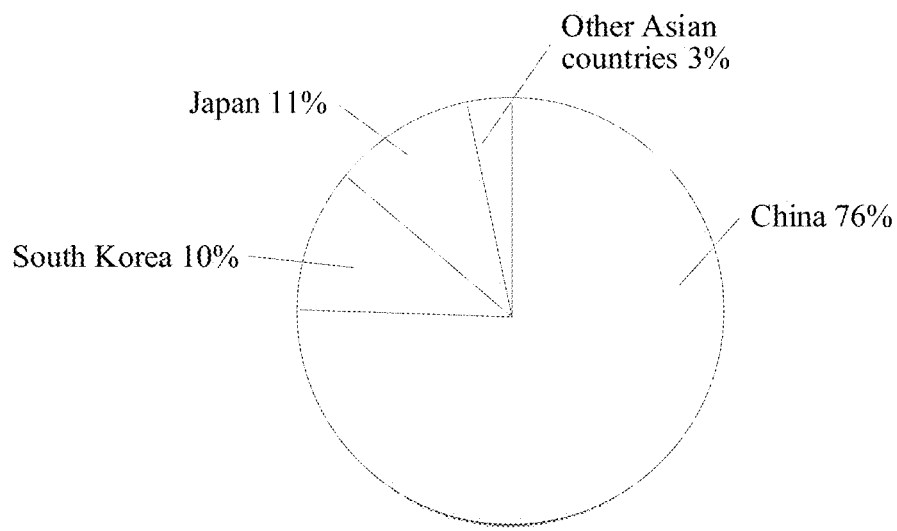
FIG. 6 is a schematic diagram of nationality translation statistics based on a CPFD according to an embodiment of the disclosure.

FIG. 5 is a schematic diagram of statistical distribution of personal photos based on a CPFD according to an embodiment of the disclosure. As shown in the figure, for example, the CPFD includes a total of 9,071 identity tags, assuming that the CPFD includes 2,596,325 images, each identity tag has an average of 286 images. Given that datasets included in the CPFD all belong to celebrities, for example, a celebrity Zhang San has 400 images, and a celebrity Li Si has 200 images, it can be seen from FIG. 5 that there is one identity tag with 0 to 10 images, and there are 178 identity tags with 0 to 30 images, 1816 identity tags with 30 to 100 images, 5499 identity tags with 100 to 500 images, and 1577 identity tags with more than 500 images. Most of the identities in the CPFD are Asians. FIG. 6 is a schematic diagram of nationality translation statistics based on a CPFD according to an embodiment of the disclosure. As shown in the figure, for the face images in the CPFD, 76% are from China, 10% are from South Korea, 11% are from Japan, and 3% are from other Asian countries.

Figure 7:
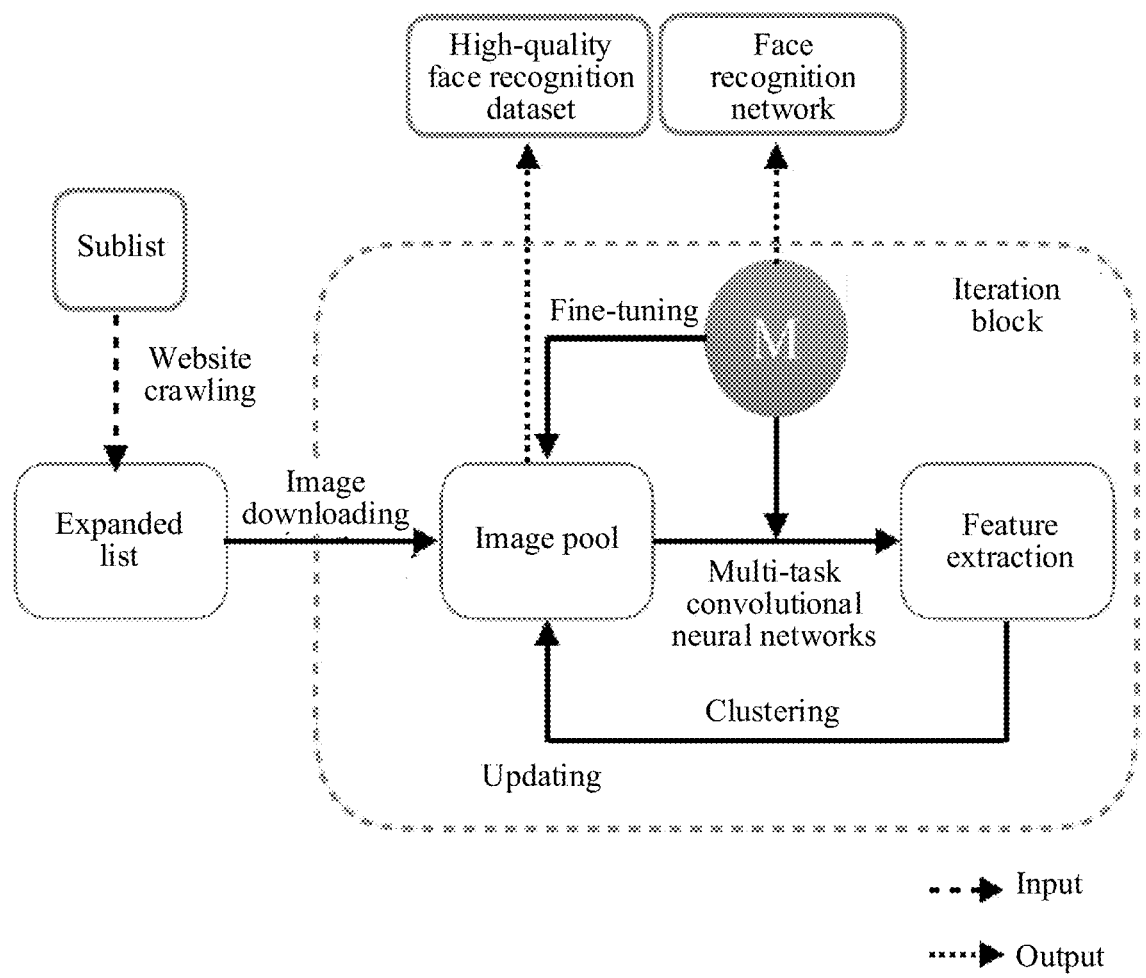
FIG. 7 is a schematic structural diagram of an automatic dataset collection system according to an embodiment of the disclosure.
Figure 8:
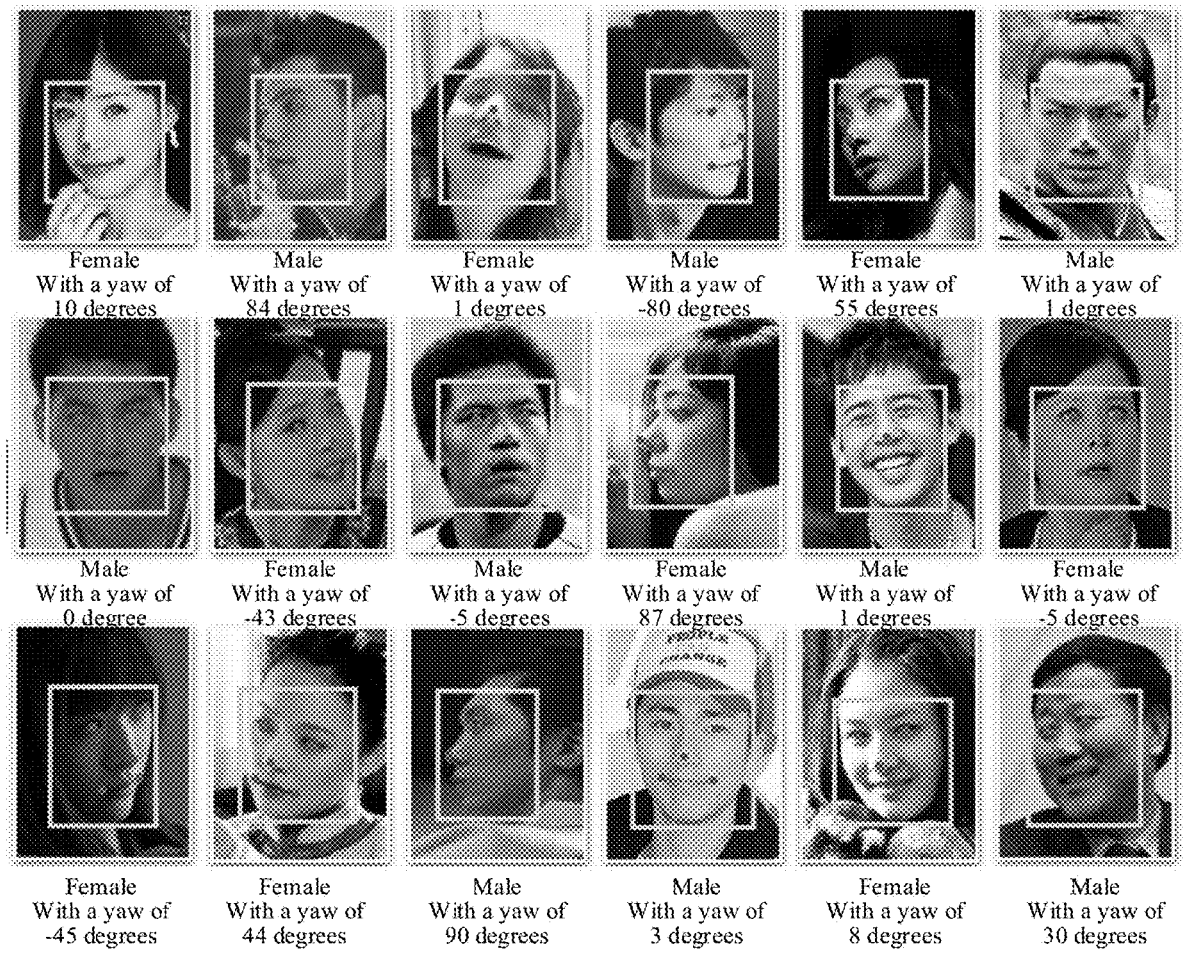
FIG. 8 is a schematic diagram of annotation information based on a CPFD according to an embodiment of the disclosure.

To facilitate data collection, the disclosure provides an automatic dataset collection system. FIG. 7 is a schematic structural diagram of an automatic dataset collection system according to an embodiment of the disclosure. As shown in the figure, the automatic dataset collection system includes a name list, and collects and clears images by hierarchical clustering. An input of the system is a sublist Lseed, a model M obtained by pre-training is used as a feature extractor, and the system outputs a high-quality face recognition dataset and a trained face recognition network. An illustrative collection process is as follows. Firstly, the sublist Lseed is collected. Assuming that Lseed may include 600 persons, related images on a website are searched for by using identities of the 600 persons, thereby expanding Lseed to a list of more than 10,000 persons. It would be understood that 10,000 is just an example, and an expanded list of other quantities of persons may also be set in actual applications of the disclosure. Then, images (which may be photos, composite images, or the like) belonging to the expanded list are downloaded from the website, so as to obtain an image pool. Face images in the image pool are detected by using a multi-task convolutional neural network (MTCNN). The detected face images are used for training to obtain a preliminary face recognition network. After the training of the face recognition network, features of each person are extracted, and then images that do not belong to the person in the images are filtered out according to the features of each person through a clustering algorithm. For example, when images of Zhang San are searched for, images of Zhao Wu may be returned. In this case, the images of Zhao Wu need to be filtered out. The images filtered out are then used for training a new face recognition network. This new face recognition network has a better recognition effect. The dataset is continuously filtered based on the new face recognition network. After a plurality of iterations, noise in the dataset may be cleaned up, so as to obtain an ideal dataset (such as a CPFD). FIG. 8 is a schematic diagram of annotation information based on a CPFD according to an embodiment of the disclosure. As shown in the figure, each identity tag in the CPFD corresponds to annotation information, and the annotation information includes gender and face yaw.

Figure 9:
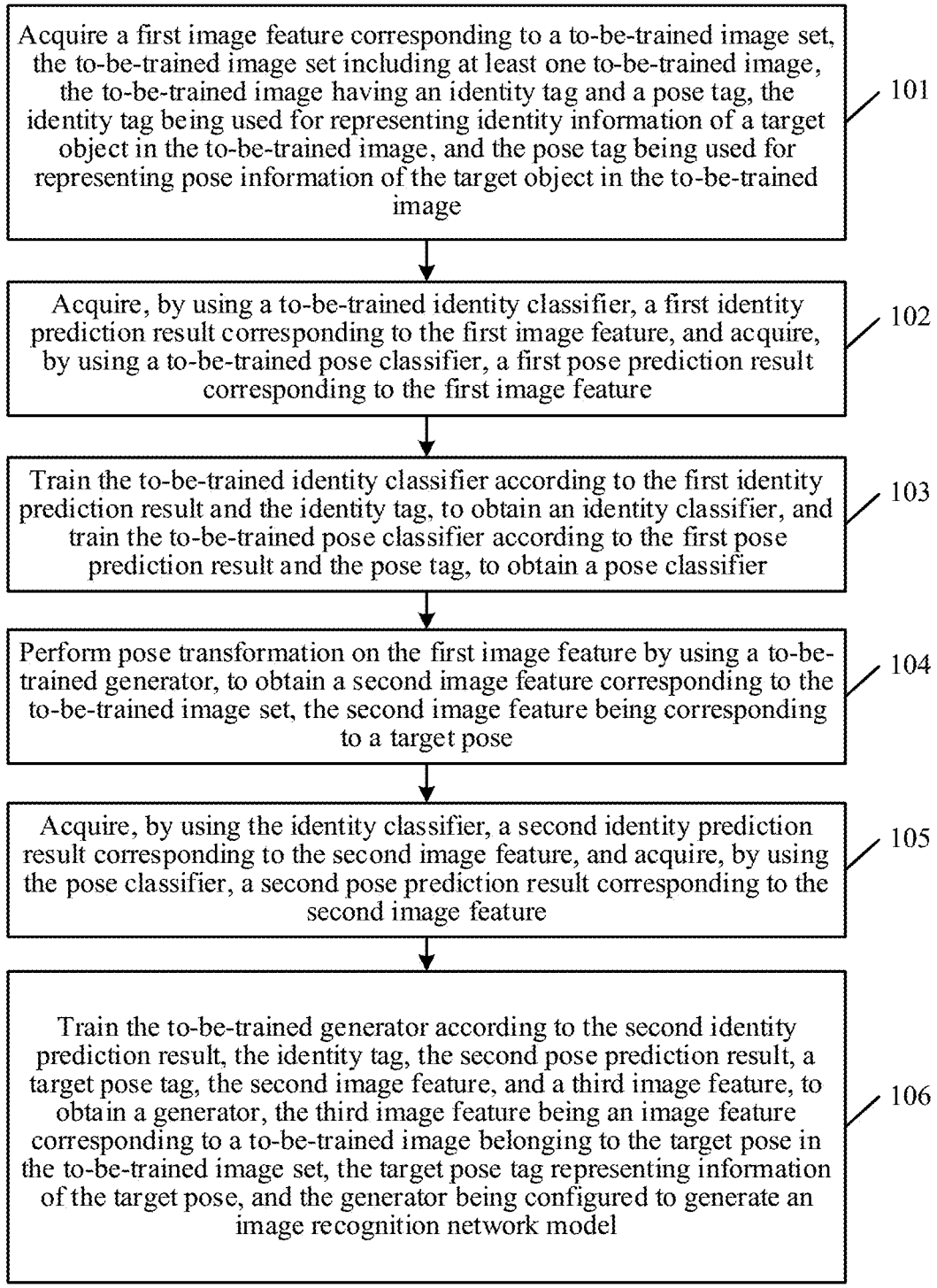
FIG. 9 is a schematic diagram of an image recognition network model training method according to an embodiment of the disclosure.

In combination with the foregoing description, an image recognition network model training method in the disclosure is described below. The image recognition network model training method may be applied to a computer device. The computer device refers to an electronic device with data computing and storage capabilities, such as a server or a terminal device. Referring to FIG. 9, an image recognition network model training method according to an embodiment of the disclosure includes the following operations 101-106:

101. Acquire a first image feature corresponding to an image set, the image set including at least one image to be trained, the image having an identity tag and a pose tag, the identity tag being used for representing identity information of a target object in the image, and the pose tag being used for representing pose information of the target object in the image.

In an example embodiment, a model training apparatus first acquires the image set. The image set may include at least one image to be trained. However, to ensure the efficiency of training, the image set may include a plurality of images, such as 265 images. The image set may be from a CPFD or from other types of datasets, which is not limited herein. The model training apparatus may be deployed on a server or on a terminal device, which is not limited herein. The image may be a face image, an animal image, a landscape image, or other types of images. In the disclosure, the description is provided with an example in which the image is a face image. However, this is not a limitation on the disclosure.

Figure 10:
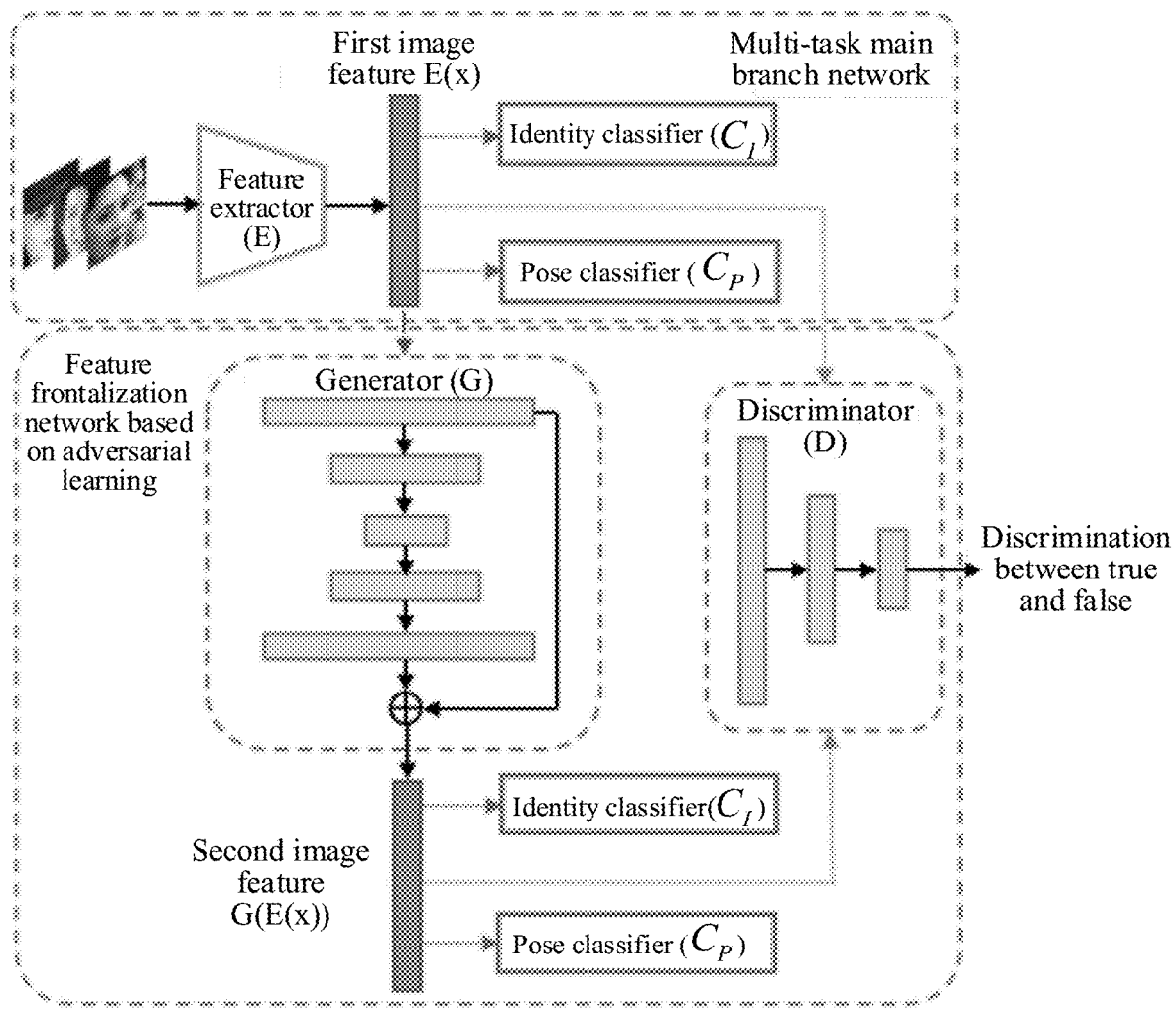
FIG. 10 is a schematic structural diagram of an image recognition network model according to an embodiment of the disclosure.

For ease of understanding, FIG. 10 is a schematic structural diagram of an image recognition network model according to an embodiment of the disclosure. As shown in the figure, the training of the image recognition network model mainly includes the training of the following two networks, a multi-task main branch network and a feature frontalization network based on adversarial learning. The multi-task main branch network may perform image recognition (e.g., face recognition) and pose prediction at the same time. Each image in the image set is inputted into a feature extractor (E). The feature extractor (E) outputs a first image feature E(x) corresponding to each image. The first image feature represents an initial face representation of each image in the image set, and a length of the first image feature is m, where m may be a 64 floating-point number or a 128 floating-point number.

It would be understood that the feature extractor (E) may be any deep CNN, such as a residual neural network (ResNet) or a visual geometry group (VGG) network, which is not limited herein.

It would be understood that each image has a corresponding identity tag and a corresponding pose tag. The identity tag is used for representing identity information of a target object in the image. The target object may refer to a character in the image. The identity information may be expressed as an identifier, such as 001. The identity information with the identifier 001 indicates "Zhang San". The pose tag is used for representing pose information of the target object in the image. The pose information may be expressed as an identifier, such as 100. The pose information with the identifier 100 indicates that a yaw ranges from 5 degrees to 15 degrees.

In the disclosure, the pose tag is designed for (or indicate) a yaw. Each pose tag corresponds to a yaw in a range. It would be understood that in actual applications of the disclosure, the pose tag may indicate a pitch or a roll or a pitch and a roll or a combination of at least two of the yaw, the pitch, and the roll.

102. Acquire, by using an identity classifier, a first identity prediction result corresponding to the first image feature, and acquire, by using a pose classifier, a first pose prediction result corresponding to the first image feature.

In an example embodiment, based on the first image feature obtained in operation 101, the model training apparatus inputs the first image feature to the identity classifier. The identity classifier outputs the first identity prediction result. For example, an identity tag of an image A in the image set is 001 (Zhang San), and a first identity prediction result of the image A is 026 (Li Si). Similarly, based on the first image feature obtained in operation 101, the first image feature is inputted to the pose classifier. The pose classifier outputs the first pose prediction result. For example, a pose tag of the image A in the image set is 101 (with a yaw ranging from −5 degrees to 0 degree), and the first pose prediction result of the image A is 103 (with a yaw ranging from 0 degree to 5 degrees).

103. Train the identity classifier according to the first identity prediction result and the identity tag, to obtain a trained identity classifier, and train the pose classifier according to the first pose prediction result and the pose tag, to obtain a trained pose classifier.

In an example embodiment, the model training apparatus may train the multi-task main branch network shown in FIG. 10 by using a cross-entropy classification loss function. That is, the identity classifier is trained according to the first identity prediction result and the identity tag by using the cross-entropy classification loss function, so as to obtain the trained identity classifier. Similarly, the pose classifier is trained according to the first pose prediction result and the pose tag by using the cross-entropy classification loss function, so as to obtain the trained pose classifier.

104. Perform pose transformation on the first image feature by using a generator, to obtain a second image feature corresponding to the image set, the second image feature being corresponding to a target pose.

In an example embodiment, after completion of operation 101 to operation 103, the identity classifier $C_I$ and the pose classifier $C_P$ shown in FIG. 10 are obtained by training. Still referring to FIG. 10, the feature frontalization network based on adversarial learning includes a generator (G) and a discriminator (D) formed by multi-layer perception (MLP). The generator (G) is mainly configured to generate a frontal feature expression that maintains original identity information. The discriminator (D) is mainly configured to determine whether an original feature or a generated feature is inputted.

The model training apparatus inputs the first image feature E(x) corresponding to each image in the image set to the generator. The generator outputs a second image feature G(E(x)) corresponding to each image. That is, an original pose feature of the image may be changed by using the generator, so that the image corresponds to the target pose. The target pose may be specifically a pose corresponding to a frontal face. A yaw of the pose is 90 degrees.

105. Acquire, by using the identity classifier, a second identity prediction result corresponding to the second image feature, and acquire, by using the pose classifier, a second pose prediction result corresponding to the second image feature.

In an example embodiment, the model training apparatus inputs the second image feature to the identity classifier. The identity classifier outputs the second identity prediction result. In principle, the second identity prediction result needs to be consistent with the identity tag of the image. For example, when the identity tag of the image A in the image set is 001 (Zhang San), the second identity prediction result outputted is 001 (Zhang San). Similarly, the second image feature is inputted to the pose classifier. The pose classifier outputs the second pose prediction result. In principle, the second pose prediction result is a pose of a face after frontalization.

It would be understood that network weight values in the identity classifier $C_I$ and the pose classifier $C_P$ are in a fixed state.

106. Train the generator according to the second identity prediction result, the identity tag, the second pose prediction result, a target pose tag, the second image feature, and a third image feature, to obtain a generator that is trained, the third image feature being an image feature corresponding to an image belonging to the target pose in the image set, the target pose tag representing information of the target pose, and the generator being configured to generate an image recognition network model.

In an example embodiment, the model training apparatus takes the second image feature G(E(x)) corresponding to each image as a false input of the discriminator (D), and takes the third image feature corresponding to the target pose in the image set as a true input of the discriminator (D). The target pose may be a pose corresponding to the frontal face. A yaw of the pose is 90 degrees. The third image feature is a result obtained after feature expression is performed on images belonging to the frontal face in the image set. A real frontal feature (the third image feature) is taken as the true input of the discriminator (D), because of the fact that the discriminator (D) takes poses as a main basis for discrimination due to different poses before and after frontalization and cannot reasonably capture feature distribution of normal face features. Using a real frontal feature (the third image feature) as the input of the discriminator (D) prevents these issues.

The model training apparatus trains the discriminator according to the second image feature and the third image feature by using a loss function, to obtain a trained discriminator. Based on the trained discriminator, the model training apparatus continuously trains the generator according to the second identity prediction result, the identity tag, the second pose prediction result, and the target pose tag by using the loss function, to obtain the generator that is trained. The generator, as one part of the image recognition network model, is configured to transform a profile image into a frontal image. The other part of the image recognition network model is a recognition module. The recognition module is configured to recognize the frontalized face image and then determine an identity of the face image.

In the embodiments of the disclosure, an image recognition network model training method is provided. Firstly, a first image feature corresponding to an image set is acquired. Then, a first identity prediction result corresponding to the first image feature is acquired by using an identity classifier, and a first pose prediction result corresponding to the first image feature is acquired by using a pose classifier. The identity classifier is trained according to the first identity prediction result and an identity tag, and the pose classifier is trained according to the first pose prediction result and a pose tag. Pose transformation is performed on the first image feature by using a generator, to obtain a second image feature corresponding to the image set. A second identity prediction result corresponding to the second image feature is acquired by using the identity classifier, and a second pose prediction result corresponding to the second image feature is acquired by using the pose classifier. Finally, the generator is trained according to the second identity prediction result, the identity tag, the second pose prediction result, a target pose tag, the second image feature, and a third image feature, to obtain a generator that is trained. With the foregoing manner, training is performed based only on image features, and the image features are organized. Therefore, spatial dimensions are relatively smaller compared to original images, thereby reducing the difficulty of training and the complexity of the model, and reducing the consumption of computing resources.

Based on the embodiment corresponding to FIG. 9, in a first example embodiment of the image recognition network model training method according to the embodiments of the disclosure, the acquiring, by using an identity classifier, a first identity prediction result corresponding to the first image feature may include:

calculating an identity output probability of each identity category according to a network weight value of the identity classifier and the first image feature; and determining, according to the identity output probability of each identity category, the first identity prediction result corresponding to the first image feature; and the training the identity classifier according to the first identity prediction result and the identity tag includes:

determining a model parameter of the identity classifier according to the first identity prediction result and the identity tag by using a first loss function; and generating a final identity classifier by using the model parameter of the identity classifier.

In an example embodiment, a method for obtaining an identity classifier by training is described. Specifically, firstly, the model training apparatus inputs images in the image set to a feature extractor. Network parameters of the feature extractor, the identity classifier, and the pose classifier all need to be trained, and an output of a neural network may be constrained by using pose tags and identity tags. This constraint process is to enable the feature extractor to extract features in images. The identity classifier constrains the neural network by using the identity tag, so that a gradient is back-propagated. The gradient simultaneously updates the feature extractor and the identity classifier. Next, the model training apparatus calculates the identity output probability of each identity category according to the network weight value of the identity classifier and the predicted first image feature. There may be 1,000 identity categories. The first image feature may be an initial image feature of all the images in the image set. A first identity prediction result of each image in the image set is then determined based on the identity output probability of each identity category, that is, the first identity prediction result corresponding to each first image feature is obtained.

Finally, the model training apparatus calculates the first identity prediction result of each image and the identity tag of each image by using a first loss function. When a result of the first loss function is minimized, model parameters corresponding to the minimum value are obtained. By using the model parameters of the identity classifier, a final identity classifier (trained identity classifier) is generated.

It would be understood that the entire multi-task main branch network is jointly trained. This is because the feature extractor needs to learn useful information from identity tags and pose tags to obtain an effective feature extractor. In an initial stage, the network parameters of the feature extractor and the network parameters of the pose classifier are meaningless. However, after joint training, the feature extractor and the pose classifier may be synchronously trained, so as to obtain a better feature extractor (with high accuracy) and a better pose classifier (with high accuracy).

In the embodiments of the disclosure, a method for obtaining an identity classifier by training is provided. Firstly, an identity output probability of each identity category is calculated according to a network weight value of the identity classifier and the first image feature. Then, the first identity prediction result corresponding to the first image feature is determined according to the identity output probability of each identity category. A model parameter of the identity classifier is determined according to the first identity prediction result and the identity tag by using a first loss function. Finally, the final identity classifier is generated by using the model parameter of the identity classifier. With the foregoing method, a true value and a predicted value are calculated by using the cross-entropy classification loss function. When the result of the cross-entropy classification loss function is minimized, the model parameter may be obtained. An advantage of using cross-entropy as a loss function is that the use of a sigmoid function may avoid the problem of the decrease of a learning rate of a mean squared error loss function during gradient descent, because the learning rate may be controlled by an outputted error.

Based on the first embodiment corresponding to FIG. 9, in a second example embodiment of the image recognition network model training method according to the embodiments of the disclosure, the calculating an identity output probability of each identity category according to a network weight value of the identity classifier and the first image feature may include:

calculating the identity output probability of each identity category in the following manner:

$$Y_{I_j} = \frac{e^{w_{I_j} \cdot E(x)}}{\sum_i e^{w_{I_i} \cdot E(x)}};$$

where $Y_{I_j}$ denotes the identity output probability of $j^{th}$ identity category, i denotes a total quantity of the identity categories, E(x) denotes the first image feature, $w_{I_j}$ denotes the network weight value of the identity classifier corresponding to $j^{th}$ identity category, and $w_{I_i}$ denotes the network weight value of the identity classifier corresponding to $i^{th}$ identity category.

The first loss function may be expressed as:

$$L_I = -E[\log P(y_I|Y_I)];$$

where $L_I$ denotes the first loss function, E denotes expected value calculation, $P(y_I|Y_I)$ denotes a probability that $Y_I$ belongs to $y_I$, $y_I$ denotes the identity tag, and $Y_I$ denotes the first identity prediction result.

In an example embodiment, a method of how to calculate an identity output probability of each identity category is described. Based on the multi-task main branch network shown in FIG. 10, in order to encode more identity information to the first image feature E(x), an identity classifier $C_I$ may be added to the first image feature E(x). Thus, the main branch is changed to multi-task learning. $w_I$ denotes a network weight value in the identity classifier $C_I$, and an output $Y_I$ from an identity classification branch may be formulated as:

$$Y_I = C_I(E(x));$$

$$Y_{I_j} = \frac{e^{w_{I_j} \cdot E(x)}}{\sum_i e^{w_{I_i} \cdot E(x)}};$$

where $Y_{I_j}$ denotes the identity output probability of $j^{th}$ identity category, i denotes a total quantity of the identity categories, E(x) denotes the first image feature, $w_{I_j}$ denotes the network weight value of the identity classifier corresponding to $j^{th}$ identity category, and $w_{I_j}$ denotes the network weight value of the identity classifier corresponding to $i^{th}$ identity category.

Next, the feature extractor, the identity classifier, and the pose classifier are jointly trained, which is supervised by an identity classification loss (i.e., first loss function) $L_I$ and a pose classification loss (i.e., second loss function) $L_P$. The first loss function may be expressed as:

$$L_I = -E[\log P(y_I|Y_I)]$$

where $L_I$ denotes the first loss function, E denotes expected value calculation, $P(y_I|Y_I)$ denotes a probability that $Y_I$ belongs to $y_I$, $y_I$ denotes the identity tag, and $Y_I$ denotes the first identity prediction result.

In the embodiments of the disclosure, a specific form of the first loss function is provided. With the foregoing method, a feasible basis may be provided for the implementation of the solution, thereby improving the feasibility and operability of model training.

Based on the first embodiment corresponding to FIG. 9, in a third example embodiment of the image recognition network model training method according to the embodiments of the disclosure, the acquiring, by using a pose classifier, a first pose prediction result corresponding to the first image feature may include:

calculating a pose output probability of each pose category according to a network weight value of the pose classifier and the first image feature; and determining, according to the pose output probability of each pose category, the first pose prediction result corresponding to the first image feature; and the training the pose classifier according to the first pose prediction result and the pose tag, to obtain a pose classifier includes:

determining a model parameter of the pose classifier by using a second loss function according to the first pose prediction result and the pose tag; and generating a final pose classifier by using the model parameter of the pose classifier.

In an example embodiment, a method for obtaining a pose classifier by training is described. Specifically, firstly, the model training apparatus inputs images in the image set to a feature extractor. Network parameters of the feature extractor, the identity classifier, and the pose classifier all need to be trained, and an output of a neural network may be constrained by using pose tags and identity tags. This constraint process is to enable the feature extractor to extract features in images. The pose classifier constrains the neural network by using the pose tag, so that a gradient is back-propagated. The gradient simultaneously updates the feature extractor and the pose classifier. Next, the model training apparatus calculates the pose output probability of each pose category according to the network weight value of the pose classifier and the predicted first image feature. There may be 1,000 pose categories. The first image feature may be an initial image feature of all the images in the image set. A first pose prediction result of each image in the image set is then determined based on the pose output probability of each pose category, that is, the first pose prediction result corresponding to each first image feature is obtained.

Finally, the model training apparatus calculates the first pose prediction result of each image and the pose tag of each image by using a first loss function. When a result of the first loss function is minimized, model parameters corresponding to the minimum value are obtained. By using the model parameter of the pose classifier, a final pose classifier (trained pose classifier) is generated.

It would be understood that the entire multi-task main branch network is jointly trained. This is because the feature extractor needs to learn useful information from identity tags and pose tags to obtain an effective feature extractor. In an initial stage, the network parameters of the feature extractor and the network parameters of the pose classifier are meaningless. However, after joint training, the feature extractor and the pose classifier may be synchronously trained, so as to obtain a better feature extractor and a better pose classifier.

In the embodiments of the disclosure, a method for obtaining a pose classifier by training is provided. Firstly, a pose output probability of each pose category is calculated according to a network weight value of the pose classifier and the first image feature. Then, the first pose prediction result corresponding to the first image feature is determined according to the pose output probability of each pose category. A model parameter of the pose classifier is determined according to the first pose prediction result and the pose tag by using a first loss function. Finally, the final pose classifier is generated by using the model parameter of the pose classifier. With the foregoing method, a true value and a predicted value are calculated by using the cross-entropy classification loss function. When the result of the cross-entropy classification loss function is minimized, the model parameter may be obtained. An advantage of using cross-entropy as a loss function is that the use of a sigmoid function may avoid the problem of the decrease of a learning rate of a mean squared error loss function during gradient descent, because the learning rate may be controlled by an outputted error.

Based on the third embodiment corresponding to FIG. 9, in a fourth example embodiment of the image recognition network model training method according to the embodiments of the disclosure, the calculating a pose output probability of each pose category according to a network weight value of the pose classifier and the first image feature may include:

calculating the pose output probability of each pose category in the following manner:

$$Y_{P_j} = \frac{e^{w_{P_j} \cdot E(x)}}{\sum_i e^{w_{P_i} \cdot E(x)}};$$

where $Y_{P_j}$ denotes the pose output probability of $j^{th}$ pose category, i denotes a total quantity of the pose identities, $E(x)$ denotes the first image feature, $w_{P_j}$ denotes the network weight value of the pose classifier corresponding to $j^{th}$ pose category, and $w_{P_i}$ denotes the network weight value of the pose classifier corresponding to $i^{th}$ pose category.

The second loss function may be expressed as:

$$L_P = -E[\log P(y_P|Y_P)];$$

where $L_P$ denotes the second loss function, E denotes expected value calculation, $P(y_P|Y_P)$ denotes a probability that $Y_P$ belongs to $y_P$, $y_P$ denotes the pose tag, and $Y_P$ denotes the second identity prediction result.

In an example embodiment, a method of how to calculate a pose output probability of each pose category is described. Based on the multi-task main branch network shown in FIG. 10, in order to encode more pose information to the first image feature $E(x)$, a pose classifier $C_P$ may be added to the first image feature $E(x)$. Thus, the main branch is changed to multi-task learning. Supervision information during the multi-task learning is from pose values obtained by using a DeepPose algorithm for prediction. All the obtained pose values are segmented and classified in fixed intervals to obtain true values of poses for training. $w_P$ denotes a network weight value in the pose classifier $C_P$, and an output $Y_P$ from a pose classification branch may be formulated as:

$$Y_P = C_P(E(x));$$

$$Y_{P_j} = \frac{e^{w_{P_j} \cdot E(x)}}{\sum_i e^{w_{P_i} \cdot E(x)}};$$

where $Y_{P_j}$ denotes the pose output probability of $j^{th}$ pose category, i denotes a total quantity of the pose categories, $E(x)$ denotes the first image feature, $w_{P_j}$ denotes the network weight value of the pose classifier corresponding to $j^{th}$ pose category, and $w_{P_i}$ denotes the network weight value of the pose classifier corresponding to $i^{th}$ pose category.

Next, the feature extractor, the identity classifier, and the pose classifier are jointly trained, which is supervised by an identity classification loss (i.e., first loss function) and a pose classification loss (i.e., second loss function). The second loss function may be expressed as:

$$L_P = -E[\log P(y_P|Y_P)];$$

where $L_P$ denotes the second loss function, E denotes expected value calculation, $P(y_P|Y_P)$ denotes a probability that $Y_P$ belongs to $y_P$, $y_P$ denotes the pose tag, and $Y_1$ denotes the second identity prediction result.

In the embodiments of the disclosure, a specific form of the second loss function is provided. With the foregoing method, a feasible basis may be provided for the implementation of the solution, thereby improving the feasibility and operability of model training.

Based on FIG. 9 and any one of the first to fourth embodiments corresponding to FIG. 9, in a fifth example embodiment of the image recognition network model training method according to the embodiments of the disclosure, the acquiring, by using the identity classifier, a second identity prediction result corresponding to the second image feature, and acquiring, by using the pose classifier, a second pose prediction result corresponding to the second image feature may include:

acquiring, by using the pose classifier (obtained by training) and a target pose tag corresponding to the second image feature, the second pose prediction result corresponding to the second image feature; and acquiring, by using the identity classifier (obtained by training) and an identity tag corresponding to the first image feature, the second identity prediction result corresponding to the second image feature.

In an example embodiment, after the pose classifier and the identity classifier are obtained by training, based on the feature frontalization network based on adversarial learning shown in FIG. 10, the first image feature $E(x)$ outputted by the main branch network is taken as an input of the generator, to obtain a second image feature $G(E(x))$ after a pose is changed by the generator. Then, the second image feature $G(E(x))$ is inputted to the pose classifier and the identity classifier that are trained, and network weights of the pose classifier and the identity classifier are fixed. In this case, when the generator is trained, a target pose tag corresponding to the second image feature and the identity tag corresponding to the first image feature are added, and a true value is taken as a constraint.

Specifically, when a second pose prediction result corresponding to the second image feature is predicted, the target pose tag corresponding to the second image feature needs to be used as supervision. The target pose tag refers to a true value of a pose after frontalization, so as to ensure that the second image feature $G(E(x))$ after frontalization has a frontal pose. When a second identity prediction result corresponding to the second image feature is predicted, the identity tag corresponding to the first image feature needs to be used as supervision. The identity tag is a true value of an identity, so as to ensure that the second image feature $G(E(x))$ after frontalization and the first image feature $E(x)$ before frontalization have the same identity.

Further, in the embodiments of the disclosure, a method for acquiring, by a pose classifier, a second pose prediction result and a second identity prediction result that correspond to a second image feature is provided. That is, the second pose prediction result corresponding to the second image feature is acquired by using the pose classifier and a target pose tag corresponding to the second image feature, and the second identity prediction result corresponding to the second image feature is acquired by using an identity classifier and an identity tag corresponding to the first image feature. With the foregoing method, when network parameters of the identity classifier and network parameters of the pose classifier are fixed, the true value of a pose after frontalization and the true value of an identity before frontalization are used as supervision, so that a feature after frontalization may be mandatorily constrained to maintain the same identity as the feature before frontalization and the feature after frontalization may also be constrained to have a frontal pose.

Based on the embodiment corresponding to FIG. 9, in a sixth example embodiment of the image recognition network model training method according to the embodiments of the disclosure, the training the generator according to the second identity prediction result, the identity tag, the second pose prediction result, a target pose tag, the second image feature, and a third image feature, to obtain a generator may include:

determining a first minimum loss result according to the second identity prediction result and the identity tag by using a third loss function;

determining a second minimum loss result according to the second pose prediction result and the target pose tag by using a fourth loss function;

determining a third minimum loss result according to the second image feature and the third image feature by using a fifth loss function, the second image feature being a false input of the discriminator, the third image feature being a true input of the discriminator, and the discriminator being configured to discriminate the authenticity of the second image feature and the third image feature;

determining a fourth minimum loss result according to the third image feature by using a sixth loss function; and training the generator according to the first minimum loss result, the second minimum loss result, the third minimum loss result, and the fourth minimum loss result, to obtain the generator.

In an example embodiment, how to train a generator is described. Specifically, four parts need to be trained, that is, loss function results are alternately minimized in turn. Assuming that the image set includes 265 face images to be trained, among which 60 face images are frontal images, then feature extraction is performed on the 60 frontal images to obtain a third image feature. After a feature trainer, an identity classifier, and a pose classifier are obtained, a generator and a discriminator may be iteratively trained. Update of the generator needs to ensure identity invariance and pose frontalization. Therefore, a third loss function (for maintaining identity invariance) and a fourth loss function (for ensuring pose frontalization) are required for training, and a fifth loss function (for adversarially training the discriminator) and a sixth loss function (for adversarially training the generator) are required for supervision.

In the embodiments of the disclosure, a method for obtaining a generator by training is provided. A first minimum loss result may be determined according to the second identity prediction result and the identity tag by using a third loss function. A second minimum loss result may be determined according to the second pose prediction result and the target pose tag by using a fourth loss function. A third minimum loss result may be determined according to the second image feature and the third image feature by using a fifth loss function. A fourth minimum loss result may be determined according to the third image feature by using a sixth loss function. Finally, the generator is trained according to the four minimum loss results (the first through the fourth minimum loss results), to obtain the generator that is trained. With the foregoing method, the third loss function, the fourth loss function, the fifth loss function, and the sixth loss function are alternately minimized to obtain the generator by training, so that frontal features of normal face feature classification may be obtained under a condition of ensuring identity invariance, so as to improve the feasibility and reliability of face frontalization.

Based on the sixth embodiment corresponding to FIG. 9, in a seventh example embodiment of the image recognition network model training method according to the embodiments of the disclosure, the third loss function may be expressed as:

$$L_{IG} = -E[\log P(Y_I|Y_{IG})];$$

where $L_{IG}$ denotes the third loss function, E denotes expected value calculation, $P(y_I|Y_{IG})$ denotes a probability that $Y_{IG}$ belongs to $y_I$, $y_I$ denotes the identity tag, and $Y_{IG}$ denotes the second identity prediction result; and the fourth loss function may be expressed as:

$$L_{PG} = -E[\log P(y_F|Y_{PG})];$$

where $L_{PG}$ denotes the fourth loss function, $(y_F|Y_{PG})$ denotes a probability that $Y_{PG}$ belongs to $y_F$, $y_F$ denotes the target pose tag, and $Y_{PG}$ denotes the second pose prediction result.

In an example embodiment, the second identity prediction result and the identity tag are calculated by using a third loss function. The third loss function $L_{IG}$ may be specifically a cross-entropy loss function. The second image feature after frontalization is inputted to the identity classifier $C_I$ to obtain the following third loss function:

$$Y_{IG} = C_I(G(E(x)));$$

$$L_{IG} = -E[\log P(y_I|Y_{IG})];$$

where $L_{IG}$ denotes the third loss function, E denotes expected value calculation, $P(y_I|Y_{IG})$ denotes a probability that $Y_{IG}$ belongs to $y_I$, $y_I$ denotes the identity tag, and $Y_{IG}$ denotes the second identity prediction result.

Similarly, the second pose prediction result and the target pose tag are calculated by using a fourth loss function. The fourth loss function $L_{PG}$ may be specifically a cross-entropy loss function. The second image feature after frontalization is inputted to the pose classifier $C_P$ to obtain the following fourth loss function:

$$Y_{PG} = C_P(G(E(x)));$$

$$L_{PG} = -E[\log P(y_F|Y_{PG})];$$

where $L_{PG}$ denotes the fourth loss function, $(y_F|Y_{PG})$ denotes a probability that $Y_{PG}$ belongs to $y_F$, $y_F$ denotes the target pose tag, and $Y_{PG}$ denotes the second pose prediction result.

In the embodiments of the disclosure, specific forms of the third loss function and the fourth loss function are provided. With the foregoing method, a feasible basis may be provided for the implementation of the solution, thereby improving the feasibility and operability of model training.

Based on the sixth embodiment corresponding to FIG. 9, in an eighth example embodiment of the image recognition network model training method according to the embodiments of the disclosure, the fifth loss function may be expressed as:

$$L_{advD} = E_{f \in D_{in\_fake}}[D(f)] - E_{f \in D_{in\_real}}[D(f)];$$

where $L_{advD}$ denotes the fifth loss function, $D_{in\_fake}$ denotes the second image feature, $D_{in\_real}$ denotes the third image feature, E denotes expected value calculation, D( ) denotes an input of the discriminator, and f denotes an input feature; and the sixth loss function may be expressed as:

$$L_{advG} = -E_{f \in D_{in\_fake}}[D(f)];$$

where $L_{advG}$ denotes the sixth loss function.

In an example embodiment, the second image feature and the third image feature are calculated by using a fifth loss function. The third image feature is an image feature corresponding to a frontal image belonging to the image set. Assuming that there are a total of 265 face images in the image set, among which 60 face images are frontal images, then the third image feature is a feature extracted from the 60 frontal images. The second image feature is a false input of the discriminator, and the third image feature is a true input of the discriminator. That is, a real frontal image feature (i.e., the third face image) obtained is:

$$D_{in\_real} = E(x)_{frontal}.$$

A feature (i.e., the second image feature) after profile frontalization is:

$$D_{in\_fake} = G(E(x)).$$

The fifth loss function may be obtained based on the second image feature and the third image feature. The fifth loss function is mainly used for training the discriminator. The fifth loss function is expressed as:

$$L_{advD} = E_{f \in D_{in\_fake}}[D(f)] - E_{f \in D_{in\_real}}[D(f)];$$

where $L_{advD}$ denotes the fifth loss function, $D_{in\_fake}$ denotes the second image feature, $D_{in\_real}$ denotes the third image feature, E denotes expected value calculation, D( ) denotes an input of the discriminator, and f denotes an input feature.

A sixth loss function may be obtained based on the third image feature. The sixth loss function is mainly used for training the generator. The sixth loss function is expressed as:

$$L_{advG} = -E_{f \in D_{in\_fake}}[D(f)].$$

In the embodiments of the disclosure, specific forms of the fifth loss function and the sixth loss function are provided. With the foregoing method, a feasible basis may be provided for the implementation of the solution, thereby improving the feasibility and operability of model training.

Figure 11:
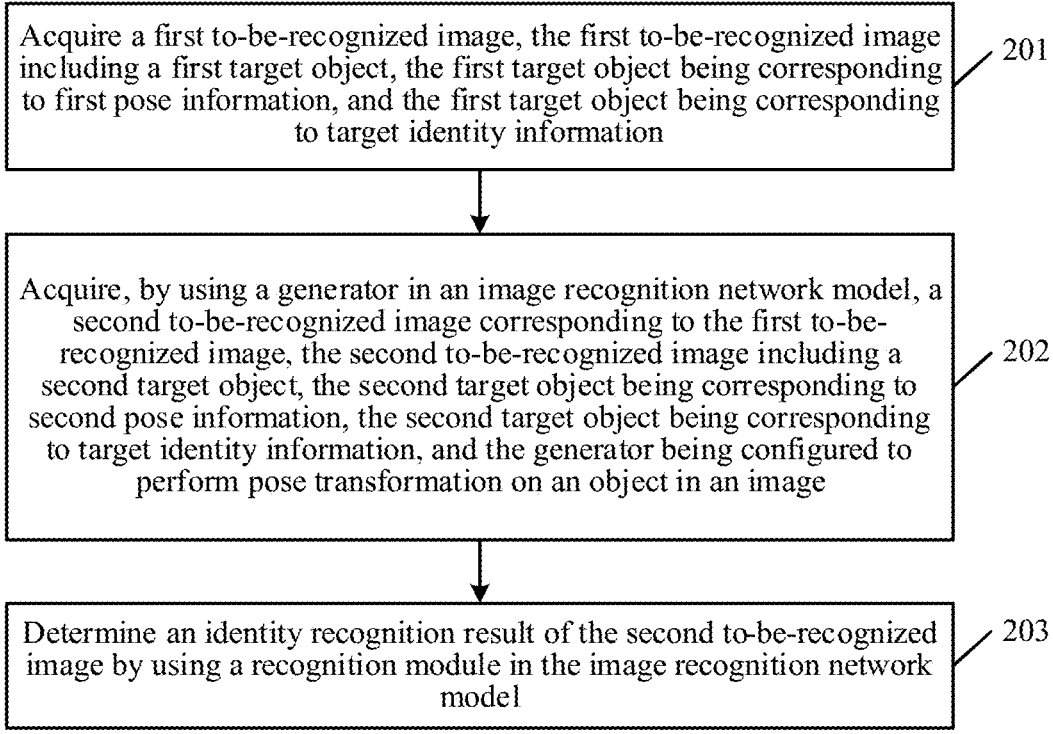
FIG. 11 is a schematic diagram of an image recognition method according to an embodiment of the disclosure.

An image recognition method in the disclosure is described below in combination with the foregoing description. The image recognition method may be applied to a computer device, such as a terminal device or a server. Referring to FIG. 11, an image recognition method according to the embodiments of the disclosure includes the following operations 201-203:

201. Acquire a first image, the first image including a first target object, the first target object being corresponding to first pose information, and the first target object being corresponding to target identity information.

In an example embodiment, a first image is first acquired. The first image generally has a yaw. For example, the yaw is 15 degrees. Then, the corresponding first pose information is 15 degrees. In actual applications of the disclosure, the first image may be a frontal image, and the first pose information corresponding to the first image is 0 degree. The first image includes a first target object. The first target object is generally a person or an animal. Assuming that there are two persons in the first image, who are Zhang San and Li Si respectively, a first target object may be selected from the two persons, such as Zhang San, and then target identity information corresponding to Zhang San is acquired.

202. Acquire, by using a generator in an image recognition network model, a second image corresponding to the first image, the second image including a second target object, the second target object being corresponding to second pose information, the second target object being corresponding to target identity information, and the generator being configured to perform pose transformation on an object in an image.

In an example embodiment, the first image is inputted to the generator of the image recognition network model. It would be understood that the method for generating the generator is obtained with reference to the embodiments corresponding to FIG. 9, and is not described in detail herein. The generator transforms the first image. Specifically, a face may be frontalized, so as to obtain a second image corresponding to the first image. The second image includes a second target object. The second target object and the first target object belong to the same object, that is, correspond to the same target identity information. However, the second target object and the first target object are different in pose. The second target object corresponds to second pose information. The second pose information may specifically refer to a frontal pose.

203. Determine an identity recognition result of the second image by using a recognition module in the image recognition network model.

In an example embodiment, the second image after frontalization is finally inputted to the recognition module in the image recognition network model. The recognition module recognizes an object in the second image, so as to obtain an identity recognition result.

In the embodiments of the disclosure, an image recognition method is provided. Firstly, a first image is acquired. Then, a second image corresponding to the first image is acquired by using a generator in an image recognition network model. Finally, an identity recognition result of the second image is determined by using a recognition module in the image recognition network model. With the foregoing method, a profile image is frontalized by using a generator, so that the accuracy of profile recognition may be significantly improved, the performance of cameras in application scenarios such as face attendance and face gates may be greatly improved, in this case, restrictions on poses of a recognized person may be weakened, and the comfort in face clock-in, gate, payment, search, and the like using a face image in various scenarios may be enhanced.

Figure 12:
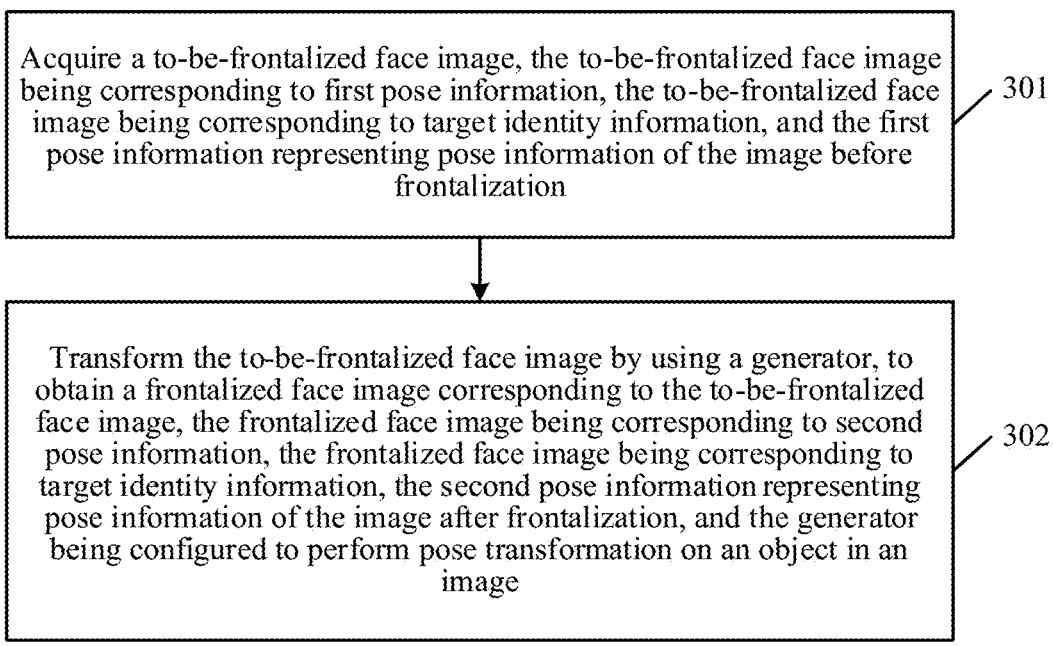
FIG. 12 is a schematic diagram of an embodiment of a face pose transformation method according to an embodiment of the disclosure.

A face pose transformation method in the disclosure is described below in combination with the foregoing description. The face pose transformation method may be applied to a computer device, such as a terminal device or a server. Referring to FIG. 12, an embodiment of a face pose transformation method according to the embodiments of the disclosure includes the following operations 301-302:

301. Acquire an image, the image being corresponding to first pose information, the image being corresponding to target identity information, and the first pose information representing pose information of the image before frontalization.

In an example embodiment, an image is first acquired. The image generally has a yaw. For example, the yaw is 15 degrees. Then, the corresponding first pose information is 15 degrees. In actual applications of the disclosure, the image may be a frontal image, and the first pose information corresponding to the image is 0 degree. The image corresponds to target identity information. The target identity information is an identity representing the image, for example, the image belongs to "Zhang San" or "Li Si".

302. Transform the image by using a generator, to obtain a frontalized face image corresponding to the image, the frontalized face image being corresponding to second pose information, the frontalized face image being corresponding to target identity information, the second pose information representing pose information of the image after frontalization, and the generator being configured to perform pose transformation on an object in an image.

Figure 13:
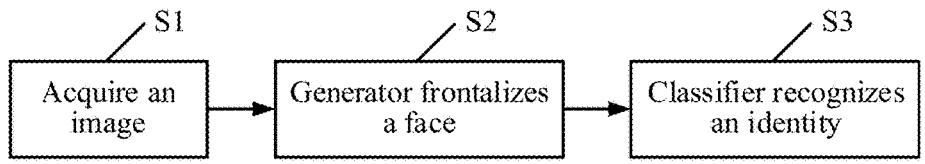
FIG. 13 is a schematic flowchart of profile recognition according to an embodiment of the disclosure.

In an example embodiment, for ease of description, FIG. 13 is a schematic flowchart of profile recognition according to an embodiment of the disclosure. As shown in the figure, an image is acquired in operation S1. In operation S2, the image is inputted to a trained generator. It would be understood that the trained generator may be obtained with reference to the embodiments corresponding to FIG. 9, and is not described in detail herein. The generator transforms the image. Specifically, a face may be frontalized, so as to obtain a frontalized face image corresponding to the image. The frontalized face image corresponds to second pose information. The second pose information may be a frontal pose or a pose set according to an actual situation. In the disclosure, a frontal pose is taken as an example. However, this is not a limitation on the disclosure. The frontalized face image and the image have the same identity information. In operation S3, a classifier may be further used to recognize the target identity information.

It would be understood that the disclosure may not only frontalize a face, but also use an adversarial network to fine-tune face features.

In the embodiments of the disclosure, a face pose transformation method is provided. Firstly, an image is acquired. Then, the image is inputted to a generator, the generator transforms the image, to obtain a frontalized face image corresponding to the image. With the foregoing method, a face image may be frontalized by using a trained generator, so as to generate a frontal image. The generator may ensure that the face image after frontalization and the face image before frontalization belong to the same identity and have different poses, so that face features after frontalization may achieve a better profile recognition effect than original profile features.

Figure 14:
FIG. 14 is a schematic diagram of visualization based on a multi pose, illumination, expressions (Multi-PIE) dataset in an experimental scenario of the disclosure.
Figure 15:
FIG. 15 is a schematic diagram of visualization based on a celebrity frontal-profile (CFP) dataset in an experimental scenario of the disclosure.

For ease of description, FIG. 14 is a schematic diagram of visualization based on a Multi-PIE dataset in an experimental scenario of the disclosure. As shown in the figure, the first row are inputted images, and the second row is an image space constructed based on original Margin-MT1 feature mapping. Margin-MT represents a multi-task face recognition network with a classification gap. The third row are images obtained by frontalization by an AFF module. FIG. 15 is a schematic diagram of visualization based on a CFP dataset in an experimental scenario of the disclosure. As shown in the figure, the first row are inputted images, and the second row is an image space constructed based on original Margin-MT1 feature mapping. Margin-MT represents a multi-task face recognition network with a classification gap. The third row are images obtained by frontalization by an AFF module.

Figure 16:
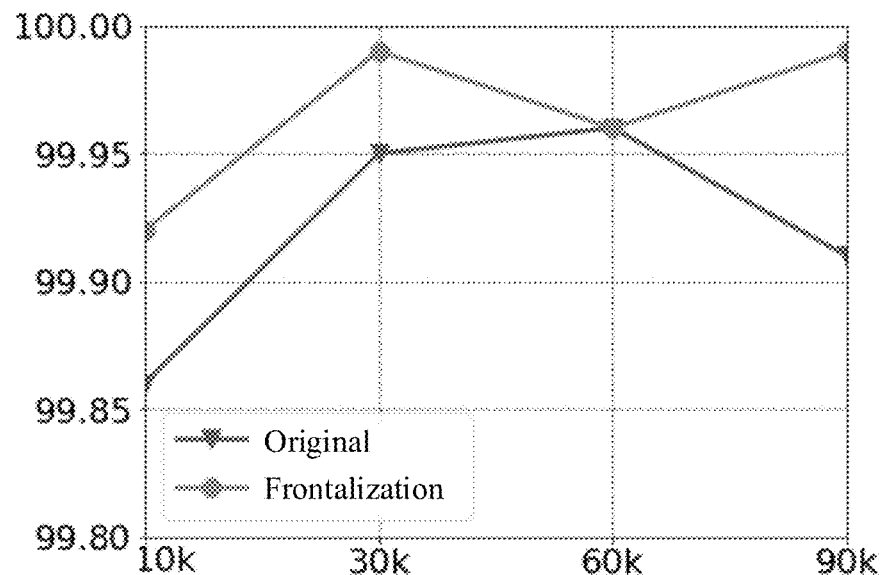
FIG. 16 is a schematic diagram of recognition capability of an image recognition network model at 15 degrees in an experimental scenario of the disclosure.
Figure 17:
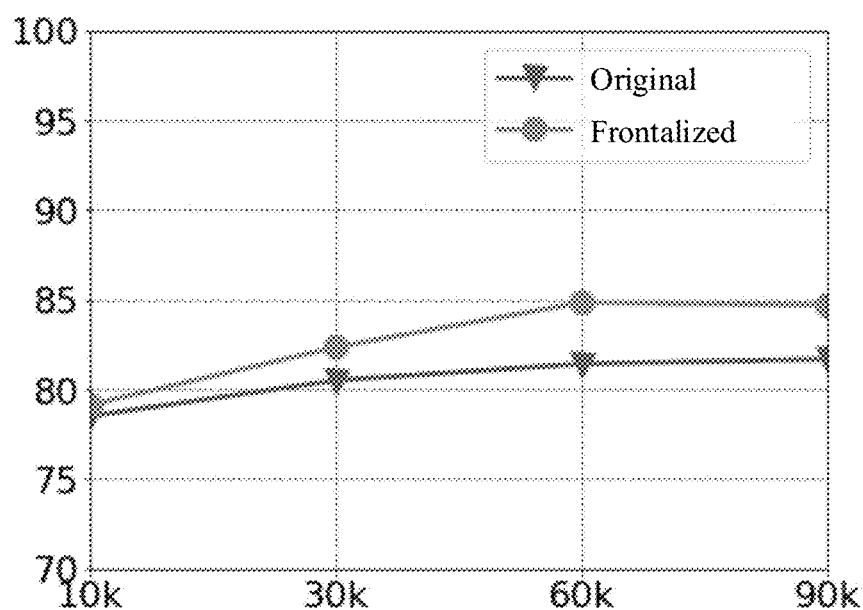
FIG. 17 is a schematic diagram of recognition capability of the image recognition network model at 90 degrees in an experimental scenario of the disclosure.

Further, for ease of description, FIG. 16 is a schematic diagram of recognition capability of an image recognition network model at 15 degrees in an experimental scenario of the disclosure. As shown in the figure, when a yaw is 15 degrees, the image recognition network model according to the disclosure has better discrimination capability. FIG. 17 is a schematic diagram of recognition capability of the image recognition network model at 90 degrees in an experimental scenario of the disclosure. As shown in the figure, the image recognition network model has the best discrimination capability at 90 degrees.

Based on the foregoing description, description is provided below with an example in which the disclosure is applied to several types of different datasets. For ease of understanding, Table 2 is a schematic table of the accuracy of recognition in a Multi-PIE dataset.

TABLE 2

| Method | ±90° | ±75° | ±60° | ±45° | ±30° | ±15° |
|---|---|---|---|---|---|---|
| CPF | — | — | — | 71.65 | 81.05 | 89.45 |
| TP-GAN | 64.03 | 84.10 | 92.93 | 98.58 | 99.85 | 99.78 |
| PIM2 | 75.00 | 91.20 | 97.70 | 98.30 | 99.40 | 99.80 |
| Margin-MT1 | 81.17 | 93.51 | 99.12 | 99.82 | 99.97 | 99.92 |
| AFF1 | 84.85 | 95.06 | 99.34 | 99.95 | 100 | 99.96 |
| Margin-MT2 | 81.96 | 93.08 | 98.27 | 99.67 | 99.92 | 99.99 |
| AFF2 | 87.49 | 95.08 | 99.41 | 100 | 100 | 100 |

Margin-MT1 and Margin-MT2 both represent a multi-task face recognition network with a classification gap, a main branch structure of Margin-MT1 and AFF1 is Resnet18, a main branch structure of Margin-MT2 and AFF2 is Resnet50, TP-GAN represents a two-path generation model, and PIM2 represents a pose invariant module. It can be seen from Table 2 that AFF2 has the highest recognition accuracy, especially at ±45°, ±30°, and ±15° of a yaw angle.

Table 3 is a schematic table of the recognition accuracy of a Multi-PIE dataset for ablation studies.

TABLE 3

| Setting | ±90° | ±75° | ±60° | ±45° |
|---|---|---|---|---|
| No $L_{adv}$ | 83.35 | 93.14 | 99.38 | 99.96 |
| No $L_{PG}$ | 83.81 | 94.49 | 99.36 | 99.96 |
| No $L_{adv}$ & $L_{PG}$ | 82.75 | 94.48 | 99.33 | 99.97 |
| AFF1 | 84.19 | 94.58 | 99.54 | 99.97 |

It can be seen from Table 3 that AFF1 has the highest recognition accuracy for ablation studies in terms of the Multi-PIE dataset.

Table 4 is a schematic table of CPFD-based recognition accuracy. Top1 represents a probability that one person most similar to a certain person is recognized from a pre-stored image base library and the person returned is the correct answer (i.e., recognition result is true). Top5 represents a probability that five persons most similar to a certain person are recognized from a pre-stored image base library and the five persons returned are the correct answer. 100 K and 1 M respectively represent sizes of the image base library. A larger base library indicates a greater difficulty of recognition.

TABLE 4

| | Identification dataset 100 K | | | | | | Identification dataset 1M | | | | | |
|---|---|---|---|---|---|---|---|---|---|---|---|---|
| | Simple difficulty | | Medium difficulty | | Hard difficulty | | Simple difficulty | | Medium difficulty | | Hard difficulty | |
| Method | Top1 | Top5 | Top 1 | Top5 | Top1 | Top5 | Top1 | Top5 | Top 1 | Top5 | Top 1 | Top5 |
| AFF1 | 58.11 | 72.36 | 37.14 | 52.65 | 19.57 | 33.57 | 44.29 | 56.61 | 24.68 | 36.56 | 10.87 | 18.38 |
| 10 k subset of AFF1 | 54.51 | 69.26 | 38.12 | 53.39 | 20.33 | 34.30 | 42.32 | 55.37 | 24.41 | 37.07 | 11.59 | 20.59 |
| 30 k subset of AFF1 | 54.23 | 68.46 | 35.61 | 51.05 | 21.39 | 34.93 | 41.86 | 54.57 | 24.58 | 35.85 | 11.04 | 19.78 |

Table 5 is a schematic table of evaluation results of a CPFD verification task. The following three indicators are used during evaluation of the verification task, which are accuracy (Acc), an equal error rate (EER), and a true positive rate (TPR).

TABLE 5

| | Simple difficulty | | | Medium difficulty | | | Hard difficulty | | |
|---|---|---|---|---|---|---|---|---|---|
| Method | TPR | EER | Acc | TPR | EER | Acc | TPR | EER | Acc |
| AFF1 | 82.11 ± 1.10 | 3.49 | 96.55 ± 0.20 | 66.84 ± 1.63 | 4.27 | 95.84 ± 0.34 | 53.26 ± 2.12 | 6.73 | 93.66 ± 0.67 |
| 10 k subset of AFF1 | 79.06 ± 1.01 | 4.07 | 95.98 ± 0.16 | 67.53 ± 1.69 | 4.95 | 95.19 ± 0.37 | 53.90 ± 2.75 | 7.18 | 93.04 ± 0.56 |

TABLE 5-continued

| | Simple difficulty | | | Medium difficulty | | | Hard difficulty | | |
|---|---|---|---|---|---|---|---|---|---|
| Method | TPR | EER | Acc | TPR | EER | Acc | TPR | EER | Acc |
| 30 k subset of AFF1 | 78.92 ± 1.14 | 4.09 | 95.92 ± 0.19 | 66.60 ± 1.57 | 5.05 | 95.00 ± 0.31 | 54.00 ± 3.06 | 7.37 | 92.94 ± 0.58 |

Table 6 is a schematic table of evaluation results of a CFP dataset.

TABLE 6

| Method | Acc | EER | TPR @ FPR = 0.1% |
|---|---|---|---|
| DR-GAN | 93.41 | — | — |
| PIM2 | 93.10 | 7.69 | — |
| Uvmap | 94.05 | — | — |
| DREAM | — | 6.02 | — |
| GNAP-LRes18 | 95.19 | 4.97 | 78.31 |
| Human | 94.57 | 5.02 | — |
| Margin-MT1 | 96.10 | 3.83 | 75.91 |
| AFF1 | 96.51 | 3.31 | 79.54 |
| Margin-MT2 | 97.21 | 2.66 | 76.80 |
| AFF2 | 97.37 | 2.29 | 79.89 |

TPR@false positive rate (FPR)=0.1% represents a recognition rate under a one-thousandth false recognition rate, DR-GAN represents a decoupled generation network, GNAP-LRes18 represents a global normalized average pooling residual network 18, Human refers to human performance, and DREAM refers to a residual module of equal transformation. It can be seen from Table 2 that the evaluation result of AFF2 is the best.

Table 7 is a schematic table of evaluation results in MegaFace Challenge 1.

TABLE 7

| Dataset | Batch size | Quantity of training iteration | Top1 (%) |
|---|---|---|---|
| CASIA | 128/2 | 60 k | 73.09 |
| VggFace | 128/2 | 60 k | 76.29 |
| CASIA + CPFD | 128/2 | 60 k | 78.82 |
| VggFace2 + CASIA | 128/2 | 60 k | 78.62 |
| VggFace + CPFD | 256/4 | 100 k | 84.46 |

CASIA represents the Institute of Automation, Chinese Academy of Sciences, and VGGFace represents an Oxford Visual Geometry Group face dataset.

Figure 18:
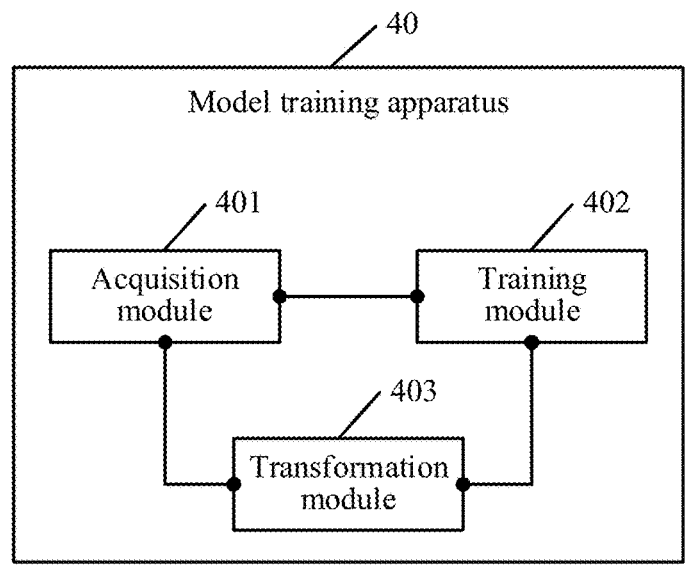
FIG. 18 is a schematic diagram of an embodiment of a model training apparatus according to an embodiment of the disclosure.

The model training apparatus in the disclosure is described in detail below. FIG. 18 is a schematic diagram of an embodiment of a model training apparatus according to an embodiment of the disclosure. The model training apparatus has a function of implementing the foregoing image recognition network model training method. The function may be implemented by hardware, or may be implemented by hardware executing corresponding software. The model training apparatus may be a computer device or may be disposed in a computer device. As shown in FIG. 18, a model training apparatus 40 may include:

an acquisition module 401, configured to acquire a first image feature corresponding to an image set, the image set including at least one image, the image having an identity tag and a pose tag, the identity tag being used for representing identity information of a target object in the image, and the pose tag being used for representing pose information of the target object in the image;

the acquisition module 401 being further configured to acquire, by using an identity classifier, a first identity prediction result corresponding to the first image feature, and acquire, by using a pose classifier, a first pose prediction result corresponding to the first image feature;

a training module 402, configured to train the identity classifier according to the first identity prediction result acquired by the acquisition module 401 and the identity tag, and train the pose classifier according to the first pose prediction result acquired by the acquisition module and the pose tag;

a transformation module 403, configured to perform, by using a generator, pose transformation on the first image feature acquired by the acquisition module 401, to obtain a second image feature corresponding to the image set, the second image feature being corresponding to a target pose;

the acquisition module 401 being further configured to acquire, by using the identity classifier obtained by training by the training module 402, a second identity prediction result corresponding to the second image feature obtained by transformation by the transformation module 403, and acquire, by using the pose classifier obtained by training by the training module 402, a second pose prediction result corresponding to the second image feature; and the training module 402 being further configured to train the generator according to the second identity prediction result acquired by the acquisition module 401, the identity tag, the second pose prediction result, a target pose tag, the second image feature, and a third image feature, to obtain a generator, the third image feature being an image feature corresponding to an image belonging to the target pose in the image set, the target pose tag representing information of the target pose, and the generator being configured to generate an image recognition network model.

In an example embodiment, the acquisition module 401 acquires a first image feature corresponding to an image set, the image set including at least one image, the image having an identity tag and a pose tag, the identity tag being used for representing identity information of a target object in the image, and the pose tag being used for representing pose information of the target object in the image. The acquisition module 401 acquires, by using an identity classifier, a first identity prediction result corresponding to the first image feature, and acquires, by using a pose classifier, a first pose prediction result corresponding to the first image feature. The training module 402 trains the identity classifier according to the first identity prediction result acquired by the acquisition module 401 and the identity tag, and trains the pose classifier according to the first pose prediction result acquired by the acquisition module and the pose tag. The transformation module 403 performs, by using a generator, pose transformation on the first image feature acquired by the acquisition module 401, to obtain a second image feature corresponding to the image set, the second image feature being corresponding to a target pose. The acquisition module 401 acquires, by using the identity classifier obtained by training by the training module 402, a second identity prediction result corresponding to the second image feature obtained by transformation by the transformation module 403, and acquires, by using the pose classifier obtained by training by the training module 402, a second pose prediction result corresponding to the second image feature. The training module 402 trains the generator according to the second identity prediction result acquired by the acquisition module 401, the identity tag, the second pose prediction result, a target pose tag, the second image feature, and a third image feature, to obtain a generator, the third image feature being an image feature corresponding to an image belonging to the target pose in the image set, the target pose tag representing information of the target pose, and the generator being configured to generate an image recognition network model.

In the embodiments of the disclosure, a model training apparatus is provided. Firstly, the model training apparatus acquires a first image feature corresponding to an image set. Then, a first identity prediction result corresponding to the first image feature is acquired by using an identity classifier, and a first pose prediction result corresponding to the first image feature is acquired by using a pose classifier. The identity classifier is trained according to the first identity prediction result and the identity tag, and the pose classifier is trained according to the first pose prediction result and the pose tag. Pose transformation is performed on the first image feature by using a generator, to obtain a second image feature corresponding to the image set. A second identity prediction result corresponding to the second image feature is acquired by using the identity classifier, and a second pose prediction result corresponding to the second image feature is acquired by using the pose classifier. Finally, the generator is trained according to the second identity prediction result, the identity tag, the second pose prediction result, a target pose tag, the second image feature, and a third image feature, to obtain a generator. With the foregoing manner, training is performed based only on image features, and the image features are organized. Therefore, spatial dimensions are relatively smaller compared to original images, thereby reducing the difficulty of training and the complexity of the model, and reducing the consumption of computing resources.

In an example embodiment, based on the embodiment corresponding to FIG. 18, in another embodiment of the model training apparatus 40 according to the embodiments of the disclosure, the acquisition module 401 is configured to calculate an identity output probability of each identity category according to a network weight value of the identity classifier and the first image feature; and determine, according to the identity output probability of each identity category, the first identity prediction result corresponding to the first image feature; and the training module 402 is configured to determine a model parameter of the identity classifier according to the first identity prediction result and the identity tag by using a first loss function; and generate the final identity classifier by using the model parameter of the identity classifier.

In the embodiments of the disclosure, a method for obtaining an identity classifier by training is provided. Firstly, an identity output probability of each identity category is calculated according to a network weight value of the identity classifier and the first image feature. Then, the first identity prediction result corresponding to the first image feature is determined according to the identity output probability of each identity category. A model parameter of the identity classifier is determined according to the first identity prediction result and the identity tag by using a first loss function. Finally, the final identity classifier is generated by using the model parameter of the identity classifier. With the foregoing method, a true value and a predicted value are calculated by using the cross-entropy classification loss function. When the result of the cross-entropy classification loss function is minimized, the model parameter may be obtained. An advantage of using cross-entropy as a loss function is that the use of a sigmoid function may avoid the problem of the decrease of a learning rate of a mean squared error loss function during gradient descent, because the learning rate may be controlled by an outputted error.

In an example embodiment, based on the embodiment corresponding to FIG. 18, in another embodiment of the model training apparatus 40 according to the embodiments of the disclosure, the acquisition module 401 is configured to calculate the identity output probability of each identity category in the following manner:

$$Y_{I_j} = \frac{e^{w_{I_j} \cdot E(x)}}{\sum_i e^{w_{I_i} \cdot E(x)}};$$

where $Y_{I_j}$ denotes the identity output probability of $j^{th}$ identity category, i denotes a total quantity of the identity categories, $E(x)$ denotes the first image feature, $w_{I_j}$ denotes the network weight value of the identity classifier corresponding to $j^{th}$ identity category, and $w_{I_i}$ denotes the network weight value of the identity classifier corresponding to $i^{th}$ identity category; and the first loss function is expressed as:

$$L_I = -E[\log P(y_I|Y_I)];$$

where $L_I$ denotes the first loss function, E denotes expected value calculation, $P(y_I|Y_I)$ denotes a probability that $Y_I$ belongs to $y_I$, $y_I$ denotes the identity tag, and $Y_I$ denotes the first identity prediction result.

In the embodiments of the disclosure, a specific form of the first loss function is provided. With the foregoing method, a feasible basis may be provided for the implementation of the solution, thereby improving the feasibility and operability of model training.

In an example embodiment, based on the embodiment corresponding to FIG. 18, in another embodiment of the model training apparatus 40 according to the embodiments of the disclosure, the acquisition module 401 is configured to calculate a pose output probability of each pose category according to a network weight value of the pose classifier and the first image feature; and determine, according to the pose output probability of each pose category, the first pose prediction result corresponding to the first image feature; and the training module 402 is configured to determine a model parameter of the pose classifier by using a second loss function according to the first pose prediction result and the pose tag; and generate the final pose classifier by using the model parameter of the pose classifier.

In the embodiments of the disclosure, a method for obtaining a pose classifier by training is provided. Firstly, a pose output probability of each pose category is calculated according to a network weight value of the pose classifier and the first image feature. Then, the first pose prediction result corresponding to the first image feature is determined according to the pose output probability of each pose category. A model parameter of the pose classifier is determined according to the first pose prediction result and the pose tag by using a first loss function. Finally, the final pose classifier is generated by using the model parameter of the pose classifier. With the foregoing method, a true value and a predicted value are calculated by using the cross-entropy classification loss function. When the result of the cross-entropy classification loss function is minimized, the model parameter may be obtained. An advantage of using cross-entropy as a loss function is that the use of a sigmoid function may avoid the problem of the decrease of a learning rate of a mean squared error loss function during gradient descent, because the learning rate may be controlled by an outputted error.

In an example embodiment, based on the embodiment corresponding to FIG. 18, in another embodiment of the model training apparatus 40 according to the embodiments of the disclosure, the acquisition module 401 is configured to calculate the pose output probability of each pose category in the following manner:

$$Y_{P_j} = \frac{e^{w_{P_j} \cdot E(x)}}{\sum_i e^{w_{P_i} \cdot E(x)}};$$

where $Y_{P_j}$ denotes the pose output probability of $j^{th}$ pose category, i denotes a total quantity of the pose identities, $E(x)$ denotes the first image feature, $w_{P_j}$ denotes the network weight value of the pose classifier corresponding to $j^{th}$ pose category, and $w_{P_i}$ denotes the network weight value of the pose classifier corresponding to $i^{th}$ pose category; and the second loss function is expressed as:

$$L_P = -E[\log P(y_P|Y_P)];$$

where $L_P$ denotes the second loss function, E denotes expected value calculation, $P(y_P|Y_P)$ denotes a probability that $Y_P$ belongs to $y_P$, $y_P$ denotes the pose tag, and $Y_P$ denotes the second identity prediction result.

In the embodiments of the disclosure, a specific form of the second loss function is provided. With the foregoing method, a feasible basis may be provided for the implementation of the solution, thereby improving the feasibility and operability of model training.

In an example embodiment, based on the embodiment corresponding to FIG. 18, in another embodiment of the model training apparatus 40 according to the embodiments of the disclosure, the acquisition module 401 is configured to acquire, by using the pose classifier and a target pose tag corresponding to the second image feature, the second pose prediction result corresponding to the second image feature; and acquire, by using the identity classifier and an identity tag corresponding to the first image feature, the second identity prediction result corresponding to the second image feature.

Further, in the embodiments of the disclosure, a method for acquiring, by a pose classifier, a second pose prediction result and a second identity prediction result that correspond to a second image feature is provided. That is, the second pose prediction result corresponding to the second image feature is acquired by using the pose classifier and a target pose tag corresponding to the second image feature, and the second identity prediction result corresponding to the second image feature is acquired by using an identity classifier and an identity tag corresponding to the first image feature. With the foregoing method, when network parameters of the identity classifier and network parameters of the pose classifier are fixed, the true value of a pose after frontalization and the true value of an identity before frontalization are used as supervision, so that a feature after frontalization may be mandatorily constrained to maintain the same identity as the feature before frontalization and the feature after frontalization may also be constrained to have a frontal pose.

In an example embodiment, based on the embodiment corresponding to FIG. 18, in another embodiment of the model training apparatus 40 according to the embodiments of the disclosure, the training module 402 is configured to determine a first minimum loss result according to the second identity prediction result and the identity tag by using a third loss function;

determine a second minimum loss result according to the second pose prediction result and the target pose tag by using a fourth loss function;

determine a third minimum loss result according to the second image feature and the third image feature by using a fifth loss function, the second image feature being a false input of the discriminator, the third image feature being a true input of the discriminator, and the discriminator being configured to discriminate the authenticity of the second image feature and the third image feature;

determine a fourth minimum loss result according to the third image feature by using a sixth loss function; and train the generator according to the first minimum loss result, the second minimum loss result, the third minimum loss result, and the fourth minimum loss result, to obtain the generator.

In the embodiments of the disclosure, a method for obtaining a generator by training is provided. A first minimum loss result may be determined according to the second identity prediction result and the identity tag by using a third loss function. A second minimum loss result may be determined according to the second pose prediction result and the target pose tag by using a fourth loss function. A third minimum loss result may be determined according to the second image feature and the third image feature by using a fifth loss function. A fourth minimum loss result may be determined according to the third image feature by using a sixth loss function. Finally, the generator is trained according to the four minimum loss results, to obtain the generator. With the foregoing method, the third loss function, the fourth loss function, the fifth loss function, and the sixth loss function are alternately minimized to obtain the generator by training, so that frontal features of normal face feature classification may be obtained under a condition of ensuring identity invariance, so as to improve the feasibility and reliability of face frontalization.

In an example embodiment, based on the embodiment corresponding to FIG. 18, in another embodiment of the model training apparatus 40 according to the embodiments of the disclosure, the third loss function is expressed as:

$$L_{IG} = -E[\log P(y_I|Y_{IG})];$$

where $L_{IG}$ denotes the third loss function, E denotes expected value calculation, $P(y_I|Y_{IG})$ denotes a probability that $Y_{IG}$ belongs to $y_I$, $y_I$ denotes the identity tag, and $Y_{IG}$ denotes the second identity prediction result; and the fourth loss function is expressed as:

$$L_{PG}=-E[\log P(y_F|Y_{PG})];$$

where $L_{PG}$ denotes the fourth loss function, $(y_F|Y_{PG})$ denotes a probability that $Y_{PG}$ belongs to $y_F$, $y_F$ denotes the target pose tag, and $Y_{PG}$ denotes the second pose prediction result.

In the embodiments of the disclosure, specific forms of the third loss function and the fourth loss function are provided. With the foregoing method, a feasible basis may be provided for the implementation of the solution, thereby improving the feasibility and operability of model training.

In an example embodiment, based on the embodiment corresponding to FIG. 18, in another embodiment of the model training apparatus 40 according to the embodiments of the disclosure, the fifth loss function is expressed as:

$$L_{advD}=E_{f\in D_{in\_fake}}[D(f)]-E_{f\in D_{in\_real}}[D(f)];$$

where $L_{advD}$ denotes the fifth loss function, $D_{in\_fake}$ denotes the second image feature, $D_{in\_real}$ denotes the third image feature, E denotes expected value calculation, D( ) denotes an input of the discriminator, and f denotes an input feature; and the sixth loss function is expressed as:

$$L_{advG}=-E_{f\in D_{in\_fake}}[D(f)];$$

where $L_{advG}$ denotes the sixth loss function.

In the embodiments of the disclosure, specific forms of the fifth loss function and the sixth loss function are provided. With the foregoing method, a feasible basis may be provided for the implementation of the solution, thereby improving the feasibility and operability of model training.

Figure 19:
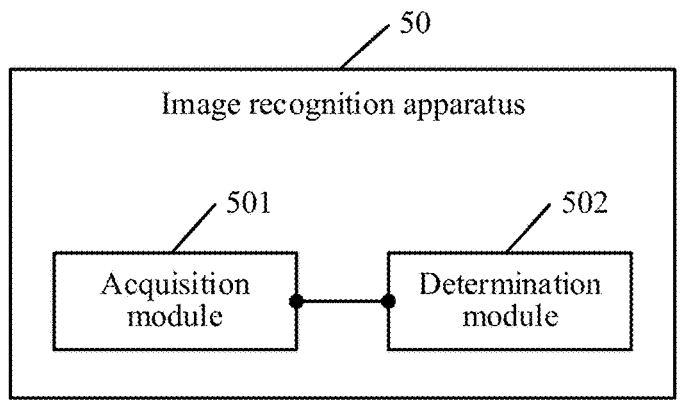
FIG. 19 is a schematic diagram of an image recognition apparatus according to an embodiment of the disclosure.

An image recognition apparatus in the disclosure is described in detail below. FIG. 19 is a schematic diagram of an image recognition apparatus according to an embodiment of the disclosure. The image recognition apparatus has a function of implementing the foregoing image recognition method. The function may be implemented by hardware, or may be implemented by hardware executing corresponding software. The image recognition apparatus may be a computer device or may be disposed in a computer device. As shown in FIG. 19, the image recognition apparatus 50 may include:

an acquisition module 501, configured to acquire a first image, the first image including a first target object, and the first target object being corresponding to first pose information;

the acquisition module 501 being further configured to acquire, by using a generator in an image recognition network model, a second image corresponding to the first image, the second image including a second target object, the second target object being corresponding to second pose information, and the generator being configured to perform pose transformation on an object in an image; and a determination module 502, configured to determine, by using a recognition module in the image recognition network model, an identity recognition result of the second image acquired by the acquisition module 501.

With the foregoing method, a profile image is frontalized by using a generator, so that the accuracy of profile recognition may be significantly improved, the performance of cameras in application scenarios such as face attendance and face gates may be greatly improved, in this case, restrictions on poses of a recognized person may be weakened, and the comfort in face clock-in, gate, payment, search, and the like using a face image in various scenarios may be enhanced.

Figure 20:
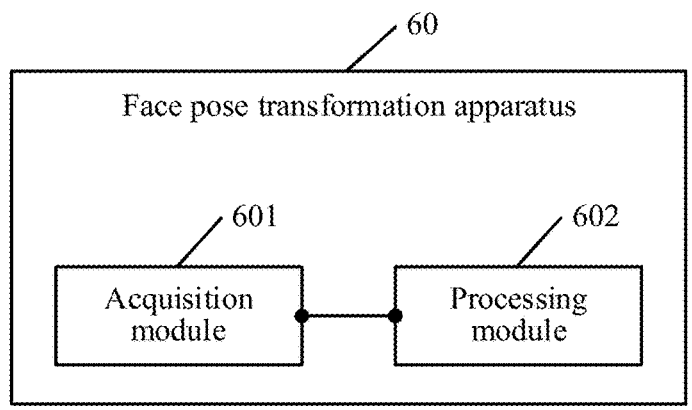
FIG. 20 is a schematic diagram of an embodiment of a face pose transformation apparatus according to an embodiment of the disclosure.

A face pose transformation apparatus in the disclosure is described in detail below. FIG. 20 is a schematic diagram of an embodiment of a face pose transformation apparatus according to an embodiment of the disclosure. The face pose transformation apparatus has a function of implementing the foregoing face pose transformation method. The function may be implemented by hardware, or may be implemented by hardware executing corresponding software. The face pose transformation apparatus may be a computer device or may be disposed in a computer device. As shown in FIG. 20, the face pose transformation apparatus 60 may include:

an acquisition module 601, configured to acquire an image, the image being corresponding to first pose information, the first pose information representing pose information of the image before frontalization; and a processing module 602, configured to transform, by using a generator, the image acquired by the acquisition module 601, to obtain a frontalized face image corresponding to the image, the frontalized face image being corresponding to second pose information, the second pose information representing pose information of the image after frontalization, and the generator being configured to perform pose transformation on an object in an image.

With the foregoing method, a face image may be frontalized by using a trained generator, so as to generate a frontal image. The generator may ensure that the face image after frontalization and the face image before frontalization belong to the same identity and have different poses, so that face features after frontalization may achieve a better profile recognition effect than original profile features.

Figure 21:
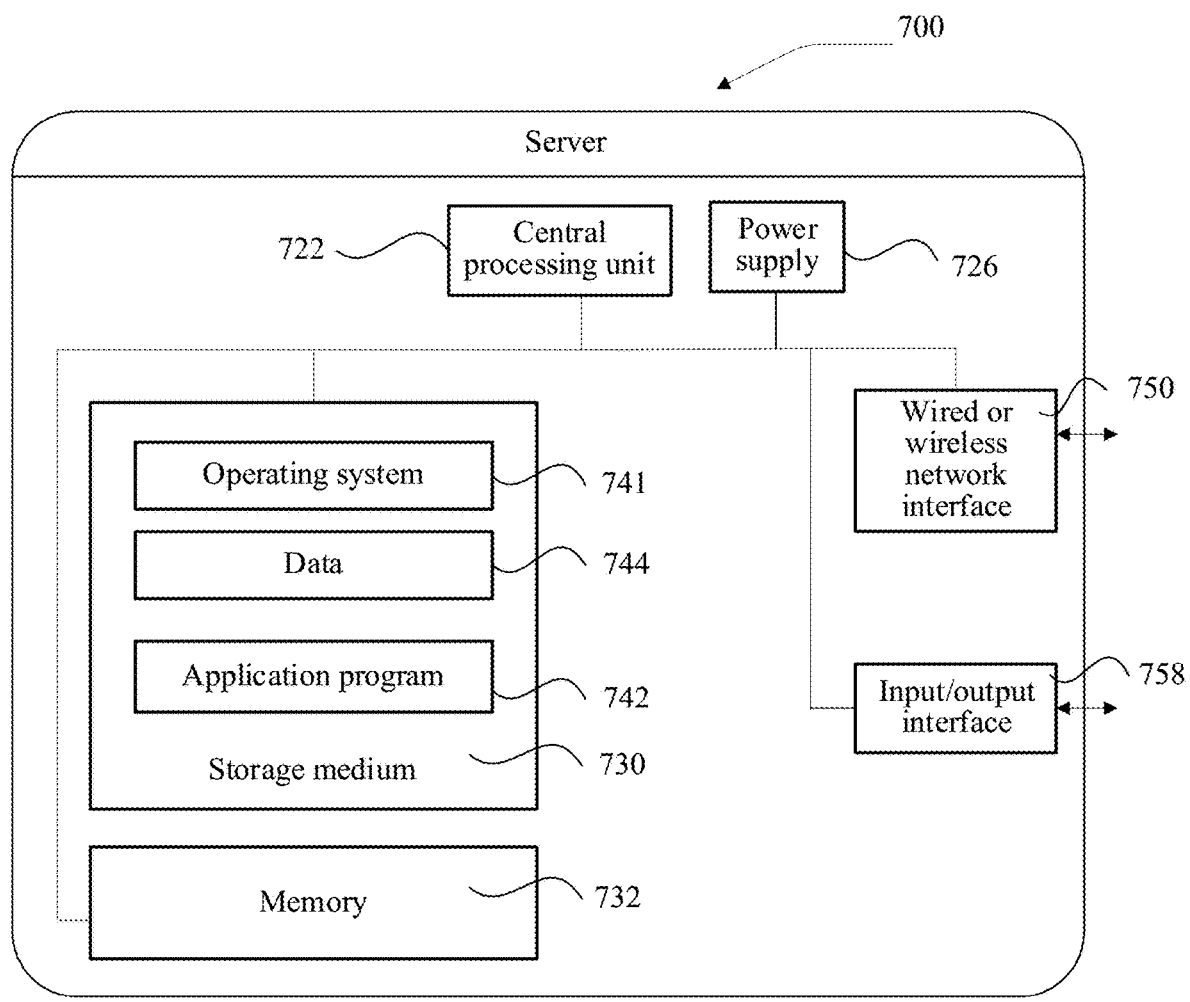
FIG. 21 is a schematic structural diagram of a server according to an embodiment of the disclosure.

FIG. 21 is a schematic structural diagram of a server according to an embodiment of the disclosure. The server 700 may vary considerably due to different configuration or performance, and may include one or more central processing units (CPUs) 722 (such as one or more processors), one or more memories 732, and one or more storage media 730 (such as one or more mass storage devices) for storing application programs 742 or data 744. The memories 732 and the storage media 730 may implement transient storage or persistent storage. The programs stored in the storage media 730 may include one or more modules (not shown in the figure), and each module may include a series of instructions to the server. Furthermore, the CPUs 722 may be configured to be in communication with the storage media 730 and to execute the series of instructions in the storage media 730 on the server 700.

The server 700 may further include one or more power supplies 726, one or more wired or wireless network interfaces 750, one or more input/output interfaces 758, and/or one or more operating systems 741, such as Windows Server™, Mac OS X™, Unix™ Linux™, and FreeBSD™.

The operations performed by the server in the foregoing embodiment may be based on the structure of the server shown in FIG. 21.

In the embodiments of the disclosure, the CPUs 722 included in the terminal further have a function of implementing the foregoing image recognition network model training method, or a function of implementing the foregoing image recognition method, or a function of the implementing the foregoing face pose transformation method.

Figure 22:
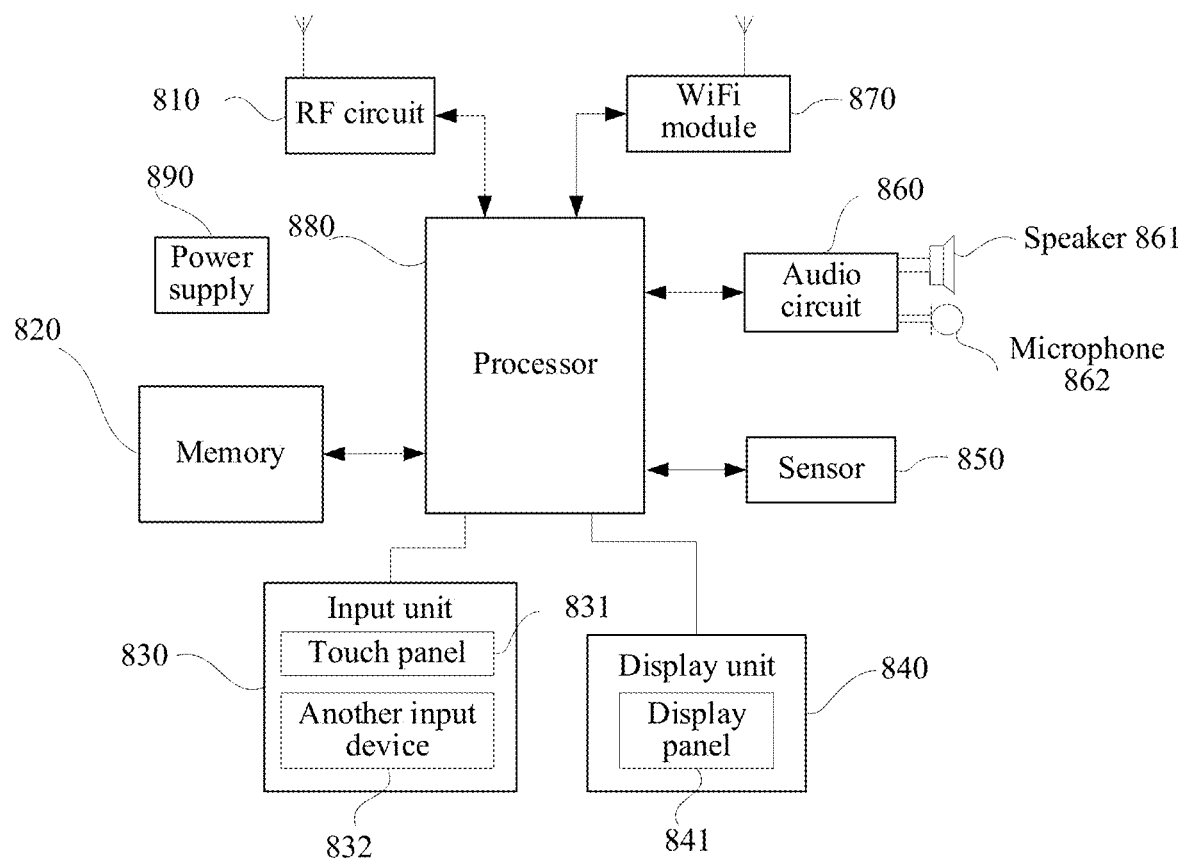
FIG. 22 is a schematic structural diagram of a terminal device according to an embodiment of the disclosure.

An embodiment of the disclosure further provides a terminal device. As shown in FIG. 22, for ease of description, only a part related to the embodiment of the disclosure is shown. For specific technical details that are not disclosed, refer to the method part according to the embodiments of the disclosure. The terminal device may be any terminal device including a mobile phone, a tablet computer, a personal digital assistant (PDA), a point of sales (POS), a vehicle-mounted computer, or the like. For example, the terminal device is a mobile phone.

FIG. 22 shows a block diagram of a partial structure of a mobile phone related to the terminal device according to an example embodiment of the disclosure. Referring to FIG. 22, the mobile phone includes components such as a radio frequency (RF) circuit 810, a memory 820, an input unit 830, a display unit 840, a sensor 850, an audio circuit 860, a wireless fidelity (WiFi) module 870, a processor 880, and a power supply 890. A person skilled in the art may understand that the structure of the mobile phone shown in FIG. 22 does not constitute any limitation on the mobile phone, and instead, the mobile phone may include components more or fewer than those shown in the figure, or combine some components, or have a different component arrangement.

The following describes the components of the mobile phone in detail with reference to FIG. 22.

The RF circuit 810 may be configured to: receive and send a signal in an information receiving or sending process or a call process, and in particular, after receiving downlink information of a base station, send the downlink information to the processor 880 for processing; and in addition, send uplink data of the mobile phone to the base station. Generally, the RF circuit 810 includes, but is not limited to, an antenna, at least one amplifier, a transceiver, a coupler, a low noise amplifier (LNA), or a duplexer. In addition, the RF circuit 810 may further communicate with a network and another device by means of wireless communication. The wireless communication may use any communication standard or protocol, which includes, but is not limited to, a Global System of Mobile communication (GSM), a general packet radio service (GPRS), code division multiple access (CDMA), wideband code division multiple access (WCDMA), long term evolution (LTE), an email, or a short messaging service (SMS).

The memory 820 may be configured to store a software program and a module. The processor 880 runs the software program and the module that are stored in the memory 820, so as to perform various function applications of the mobile phone and data processing. The memory 820 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 820 may include a high-speed random access memory, and may further include a nonvolatile memory, such as at least one magnetic disk storage device, a flash memory device, or another volatile solid-state storage device.

The input unit 830 may be configured to receive inputted digital or character information, and generate a key signal input related to user setting and function control of the mobile phone. Specifically, the input unit 830 may include a touch panel 831 and another input device 832. The touch panel 831 is also referred to as a touchscreen, may collect a touch operation (for example, an operation of a user on the touch panel 831 or near the touch panel 831 by using any proper object or accessory, such as a finger or a stylus) of the user on or near the touch panel 831, and drive a corresponding connected apparatus according to a preset program. In an example embodiment, the touch panel 831 may include two parts: a touch detection apparatus and a touch controller. The touch detection apparatus detects a touch position of a user, detects a signal brought by a touch operation, and transfers the signal to the touch controller. The touch controller receives touch information from the touch detection apparatus, converts the touch information into coordinates of a touch point, and sends the coordinates of the touch point to the processor 880, and may receive and execute a command sent by the processor 880. In addition, the touch panel 831 may be implemented by using multiple types such as a resistive type, a capacitive type, an infrared ray, and a surface acoustic wave. The input unit 830 may include the another input device 832 in addition to the touch panel 831. Specifically, the another input device 832 may include, but is not limited to, one or more of a physical keyboard, a function key (such as a volume control key or an on/off key), a trackball, a mouse, or a joystick.

The display unit 840 may be configured to display information inputted by the user or information provided to the user, and various menus of the mobile phone. The display unit 840 may include a display panel 841. In an example embodiment, the display panel 841 may be configured in a form of a liquid crystal display (LCD), an organic light-emitting diode (OLED), or the like. Further, the touch panel 831 may cover the display panel 841. When detecting a touch operation on or near the touch panel 831, the touch panel 831 transfers the touch operation to the processor 880 to determine a type of a touch event, and then the processor 880 provides a corresponding visual output on the display panel 841 according to the type of the touch event. In FIG. 22, the touch panel 831 and the display panel 841 are used as two independent components to implement input and output functions of the mobile phone. However, in some embodiments, the touch panel 831 and the display panel 841 may be integrated to implement the input and output functions of the mobile phone.

The mobile phone may further include at least one sensor 850, such as a light sensor, a motion sensor, or another sensor. Specifically, the light sensor may include an ambient light sensor and a proximity sensor. The ambient light sensor may adjust luminance of the display panel 841 according to brightness of ambient light, and the proximity sensor may turn off the display panel 841 and/or backlight when the mobile phone moves to an ear. As one type of a motion sensor, an accelerometer sensor may detect values of accelerations in all directions (generally, three axes), may detect a value and a direction of the gravity in a static state, and may be used for an application that identifies a mobile phone pose (such as screen orientation, a related game, or magnetometer pose calibration), a function related to vibration identification (such as a pedometer or a stroke), and the like. Another sensor, such as a gyroscope, a barometer, a hygrometer, a thermometer, or an infrared sensor, that may be further disposed on the mobile phone, is not described in detail herein.

The audio circuit 860, a speaker 861, and a microphone 862 may provide an audio interface between the user and the mobile phone. The audio circuit 860 may transmit, to the speaker 861, an electrical signal converted from received audio data, and the speaker 861 converts the electrical signal into a sound signal for outputting. On the other hand, the microphone 862 converts a collected sound signal into an electrical signal, and the audio circuit 860 converts the electrical signal into audio data upon receipt of the electrical signal, and outputs the audio data to the processor 880 for processing. Then, the audio data is sent to, for example, another mobile phone, by using the RF circuit 810, or the audio data is outputted to the memory 820 for further processing.

WiFi belongs to a short-range wireless transmission technology. The mobile phone may help, by using the WiFi module 870, the user to send and receive an email, browse a web page, visit streaming media, and the like. The WiFi module 870 provides wireless broadband Internet access to the user. Although the WiFi module 870 is shown in FIG. 22, it would be understood that the WiFi module 870 is not a mandatory component of the mobile phone, and may be omitted according to a requirement without changing the essence of the present disclosure.

The processor 880 is a control center of the mobile phone, is connected to each part of the entire mobile phone by using various interfaces and lines, and by running or executing the software program and/or the module that are/is stored in the memory 820 and by invoking data stored in the memory 820, performs various functions of the mobile phone and data processing, so as to perform overall monitoring on the mobile phone. In an example embodiment, the processor 880 may include one or more processing units. In an example embodiment, an application processor and a modulation and demodulation processor may be integrated into the processor 880. The application processor mainly processes an operating system, a user interface, an application program, and the like, and the modulation and demodulation processor mainly processes wireless communication. It would be understood that the modulation and demodulation processor may not be integrated into the processor 880.

The mobile phone further includes the power supply 890 (such as a battery) that supplies power to each component. In an example embodiment, the power supply may be logically connected to the processor 880 by using a power management system, so as to implement a management function such as charging, discharging, and power consumption by using the power management system.

Although not shown, the mobile phone may further include a camera, a Bluetooth module, and the like, and details are not described herein.

In the embodiments of the disclosure, the processor 880 included in the terminal device further have a function of implementing the foregoing image recognition network model training method, or a function of implementing the foregoing image recognition method, or a function of the implementing the foregoing face pose transformation method.

A person skilled in the art would clearly understand that for convenience and conciseness of description, for specific working processes of the foregoing systems, devices and units, reference may be made to the corresponding processes in the foregoing method embodiments, and details are not described herein again.

In the several embodiments provided in the disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art, or all or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of the disclosure. The storage medium includes: any medium that may store program code, such as a USB flash drive, a removable hard disk, a read-only memory (ROM), a random access memory (RAM), a magnetic disk, or an optical disc.

The foregoing technical solutions that the embodiments of the disclosure have the following advantages.

In the embodiments of the disclosure, an image recognition network model training method is provided. Firstly, a first image feature corresponding to an image set is acquired. Then, a first identity prediction result corresponding to the first image feature is acquired by using an identity classifier, and a first pose prediction result corresponding to the first image feature is acquired by using a pose classifier. The identity classifier is trained according to the first identity prediction result and an identity tag, and the pose classifier is trained according to the first pose prediction result and a pose tag. Pose transformation is performed on the first image feature by using a generator, to obtain a second image feature corresponding to the image set. A second identity prediction result corresponding to the second image feature is acquired by using the trained identity classifier, and a second pose prediction result corresponding to the second image feature is acquired by using the trained pose classifier. Finally, the generator is trained according to the second identity prediction result, the identity tag, the second pose prediction result, a target pose tag, the second image feature, and a third image feature. With the foregoing manner, training is performed based only on image features, and the image features are organized. Therefore, spatial dimensions are relatively smaller compared to original images, thereby reducing the difficulty of training and the complexity of the model, and reducing the consumption of computing resources.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions of the disclosure, but not for limiting the disclosure. Although the disclosure is described in detail with reference to the foregoing embodiments, a person of ordinary skill in the art would understand that they may still make modifications to the technical solutions described in the foregoing embodiments or make equivalent replacements to some technical features thereof, without departing from the spirit and scope of the technical solutions of the embodiments of the disclosure.

What is claimed is:

1. An image recognition network model training method, performed by a first computer device, the method comprising:

acquiring a first image feature corresponding to an image set, the image set comprising at least one image, an image of the at least one image having an identity tag and a pose tag, the identity tag representing identity information of a target object in the image, and the pose tag representing pose information of the target object in the image;

acquiring, by using an identity classifier, a first identity prediction result corresponding to the first image feature, and acquiring, by using a pose classifier, a first pose prediction result corresponding to the first image feature;

training the identity classifier according to the first identity prediction result and the identity tag, and training the pose classifier according to the first pose prediction result and the pose tag;

performing pose transformation on the first image feature by using a generator, to obtain a second image feature corresponding to the image set, the second image feature being corresponding to a target pose;

acquiring, by using the trained identity classifier, a second identity prediction result corresponding to the second image feature, and acquiring, by using the trained pose classifier, a second pose prediction result corresponding to the second image feature; and training the generator according to the second identity prediction result, the identity tag, the second pose prediction result, a target pose tag, the second image feature, and a third image feature, the third image feature being an image feature corresponding to an image belonging to the target pose in the image set, the target pose tag representing information of the target pose, and the generator being configured to generate an image recognition network model, wherein the training the generator comprises:

determining a first minimum loss result according to the second identity prediction result and the identity tag by using a third loss function;

determining a second minimum loss result according to the second pose prediction result and the target pose tag by using a fourth loss function;

determining a third minimum loss result according to the second image feature and the third image feature by using a fifth loss function, the second image feature being a false input of a discriminator, the third image feature being a true input of the discriminator, and the discriminator being configured to discriminate an authenticity of the second image feature and the third image feature;

determining a fourth minimum loss result according to the third image feature by using a sixth loss function; and training the generator according to the first minimum loss result, the second minimum loss result, the third minimum loss result, and the fourth minimum loss result.

2. The method according to claim 1, wherein the acquiring the first identity prediction result comprises:

calculating an identity output probability of each identity category according to a network weight value of the identity classifier and the first image feature; and determining, according to the identity output probability of each identity category, the first identity prediction result corresponding to the first image feature; and wherein the training the identity classifier comprises:

determining a model parameter of the identity classifier according to the first identity prediction result and the identity tag by using a first loss function.

3. The method according to claim 2, wherein the calculating the identity output probability comprises:

calculating the identity output probability of each identity category in the following manner:

$$Y_{I_j} = \frac{e^{w_{I_j} \cdot E(x)}}{\sum_i e^{w_{I_i} \cdot E(x)}};$$

where $Y_{I_j}$ denotes the identity output probability of a $j^{th}$ identity category, i denotes a total quantity of identity categories, $E(x)$ denotes the first image feature, $w_{I_j}$ denotes the network weight value of the identity classifier corresponding to the $j^{th}$ identity category, and $w_{I_i}$ denotes the network weight value of the identity classifier corresponding to an $i^{th}$ identity category; and the first loss function is expressed as:

$$L_I = -E[\log P(y_I | Y_I)];$$

where $L_I$ denotes the first loss function, E denotes expected value calculation, $P(y_I | Y_I)$ denotes a probability that $Y_I$ belongs to $y_I$, $y_I$ denotes the identity tag, and $Y_I$ denotes the first identity prediction result.

4. The method according to claim 1, wherein the acquiring the first pose prediction result comprises:

calculating a pose output probability of each pose category according to a network weight value of the pose classifier and the first image feature; and determining, according to the pose output probability of each pose category, the first pose prediction result corresponding to the first image feature; and the training the pose classifier comprises:
determining a model parameter of the pose classifier by using a second loss function according to the first pose prediction result and the pose tag.

5. The method according to claim 4, wherein the calculating the pose output probability comprises:
calculating the pose output probability of each pose category in the following manner:

$$Y_{P_j} = \frac{e^{w_{P_j} \cdot E(x)}}{\sum_i e^{w_{P_i} \cdot E(x)}};$$

where $Y_{P_j}$ denotes the pose output probability of a $j^{th}$ pose category, i denotes a total quantity of pose identities, E(x) denotes the first image feature, $w_{P_j}$ denotes the network weight value of the pose classifier corresponding to the $j^{th}$ pose category, and $w_{P_i}$ denotes the network weight value of the pose classifier corresponding to a $i^{th}$ pose category; and the second loss function is expressed as:

$$L_P = -E[\log P(y_P|Y_P)];$$

where $L_P$ denotes the second loss function, E denotes expected value calculation, $P(y_P|Y_P)$ denotes a probability that $Y_P$ belongs to $y_P$, $y_P$ denotes the pose tag, and $Y_P$ denotes the second identity prediction result.

6. The method according to claim 1, wherein the acquiring the second identity prediction result comprises:
acquiring, by using the trained pose classifier and a target pose tag corresponding to the second image feature, the second pose prediction result corresponding to the second image feature; and
acquiring, by using the trained identity classifier and an identity tag corresponding to the first image feature, the second identity prediction result corresponding to the second image feature.

7. The method according to claim 1, wherein the third loss function is expressed as:

$$L_{IG} = -E[\log P(y_I|Y_{IG})];$$

where $L_{IG}$ denotes the third loss function, E denotes expected value calculation, $P(y_I|Y_{IG})$ denotes a probability that $Y_{IG}$ belongs to $y_I$, $y_I$ denotes the identity tag, and $Y_{IG}$ denotes the second identity prediction result; and wherein the fourth loss function is expressed as:

$$L_{PG} = -E[\log P(y_F|Y_{PG})];$$

where $L_{PG}$ denotes the fourth loss function, $(y_F|Y_{PG})$ denotes a probability that $Y_{PG}$ belongs to $y_F$, $y_F$ denotes the target pose tag, and $Y_{PG}$ denotes the second pose prediction result.

8. The method according to claim 1, wherein the fifth loss function is expressed as:

$$L_{advD} = E_{f \in D_{in\_fake}}[D(f)] - E_{f \in D_{in\_real}}[D(f)];$$

where $L_{advD}$ denotes the fifth loss function, $D_{in\_fake}$ denotes the second image feature, $D_{in\_real}$ denotes the third image feature, E denotes expected value calculation, D( ) denotes an input of the discriminator, and f denotes an input feature; and wherein the sixth loss function is expressed as:

$$L_{advG} = -E_{f \in D_{in\_fake}}[D(f)];$$

where $L_{advG}$ denotes the sixth loss function.

9. An image recognition method, performed by a second computer device, the method comprising:
acquiring a first image comprising a first target object, the first target object being corresponding to first pose information;
acquiring, by using the generator in the image recognition network model according to claim 1, a second image corresponding to the first image, the second image comprising a second target object, the second target object being corresponding to second pose information, and the generator being configured to perform pose transformation on an object in an image; and
determining an identity recognition result of the second image by using a recognition module in the image recognition network model.

10. A face pose transformation method, performed by a third computer device, the method comprising:
acquiring an image corresponding to first pose information, the first pose information representing pose information of the image before frontalization; and
transforming the image by using the generator according to claim 1, to obtain a frontalized face image corresponding to the image, the frontalized face image being corresponding to second pose information, the second pose information representing pose information of the image after frontalization, and the generator being configured to perform pose transformation on an object in an image.

11. A model training apparatus, comprising:
at least one memory configured to store program code; and
at least one processor configured to read the program code and operate as instructed by the program code, the program code comprising:
first acquisition code configured to cause at least one of the at least one processor to acquire a first image feature corresponding to an image set, the image set comprising at least one image, an image of the at least one image having an identity tag and a pose tag, the identity tag representing identity information of a target object in the image, and the pose tag representing pose information of the target object in the image;
second acquisition code configured to cause at least one of the at least one processor to acquire, by using an identity classifier, a first identity prediction result corresponding to the first image feature, and acquire, by using a pose classifier, a first pose prediction result corresponding to the first image feature;
first training code configured to cause at least one of the at least one processor to train the identity classifier according to the first identity prediction result and the identity tag, and train the pose classifier according to the first pose prediction result and the pose tag;
transformation code configured to cause at least one of the at least one processor to perform, by using a generator, pose transformation on the first image feature, to obtain a second image feature corresponding to the image set, the second image feature being corresponding to a target pose;
third acquisition code configured to cause at least one of the at least one processor to acquire, by using the trained identity classifier, a second identity prediction result corresponding to the second image feature, and acquire, by using the trained pose classifier, a second pose prediction result corresponding to the second image feature; and second training code configured to cause at least one of the at least one processor to train the generator according to the second identity prediction result, the identity tag, the second pose prediction result, a target pose tag, the second image feature, and a third image feature, the third image feature being an image feature corresponding to an image belonging to the target pose in the image set, the target pose tag representing information of the target pose, and the generator being configured to generate an image recognition network model, wherein the second training code comprises:

first minimum loss result determination code configured to cause at least one of the at least one processor to determine a first minimum loss result according to the second identity prediction result and the identity tag by using a third loss function;

second minimum loss result determination code configured to cause at least one of the at least one processor to determine a second minimum loss result according to the second pose prediction result and the target pose tag by using a fourth loss function;

third minimum loss result determination code configured to cause at least one of the at least one processor to determine a third minimum loss result according to the second image feature and the third image feature by using a fifth loss function, the second image feature being a false input of a discriminator, the third image feature being a true input of the discriminator, and the discriminator being configured to discriminate an authenticity of the second image feature and the third image feature;

fourth minimum loss result determination code configured to cause at least one of the at least one processor to determine a fourth minimum loss result according to the third image feature by using a sixth loss function; and generator training code configured to cause at least one of the at least one processor to train the generator according to the first minimum loss result, the second minimum loss result, the third minimum loss result, and the fourth minimum loss result.

12. An image recognition apparatus, comprising:

at least one memory configured to store program code; and at least one processor configured to read the program code and operate as instructed by the program code, the program code comprising:

fourth acquisition code configured to cause at least one of the at least one processor to acquire a first image, the first image comprising a first target object, and the first target object being corresponding to first pose information;

fifth acquisition code configured to cause at least one of the at least one processor to acquire, by using the generator in the image recognition network model according to claim 11, a second image corresponding to the first image, the second image comprising a second target object, the second target object being corresponding to second pose information, and the generator being configured to perform the pose transformation on an object in an image; and determination code configured to cause at least one of the at least one processor to determine, by using a recognition module in the image recognition network model, an identity recognition result of the second image.

13. A face pose transformation apparatus, comprising:

at least one memory configured to store program code; and at least one processor configured to read the program code and operate as instructed by the program code, the program code comprising:

sixth acquisition code configured to cause at least one of the at least one processor to acquire an image, the image being corresponding to first pose information, the first pose information representing pose information of the image before frontalization; and processing code configured to cause at least one of the at least one processor to transform the image by using the generator according to claim 11, to obtain a frontalized face image corresponding to the image, the frontalized face image being corresponding to second pose information, the second pose information representing pose information of the image after frontalization, and the generator being configured to perform the pose transformation on an object in an image.

14. The apparatus according to claim 11, wherein the second acquisition code is further configured to cause at least one of the at least one processor to calculate an identity output probability of each identity category according to a network weight value of the identity classifier and the first image feature; and determine, according to the identity output probability of each identity category, the first identity prediction result corresponding to the first image feature; and wherein the first training code is further configured to cause at least one of the at least one processor to determine a model parameter of the identity classifier according to the first identity prediction result and the identity tag by using a first loss function.

15. The apparatus according to claim 11, wherein the second acquisition code is further configured to cause at least one of the at least one processor to calculate a pose output probability of each pose category according to a network weight value of the pose classifier and the first image feature; and determine, according to the pose output probability of each pose category, the first pose prediction result corresponding to the first image feature; and wherein the first training code is further configured to cause at least one of the at least one processor to determine a model parameter of the pose classifier by using a second loss function according to the first pose prediction result and the pose tag.

16. The apparatus according to claim 11, wherein the third acquisition code is further configured to cause at least one of the at least one processor to acquire, by using the trained pose classifier and a target pose tag corresponding to the second image feature, the second pose prediction result corresponding to the second image feature; and acquire, by using the trained identity classifier and an identity tag corresponding to the first image feature, the second identity prediction result corresponding to the second image feature.

17. A computer device, comprising: a memory, and a processor, the memory being configured to store a program; and the processor being configured to execute the program in the memory, to implement the image recognition network model training method according to claim 1.

18. A non-transitory computer-readable storage medium, storing a program, the program being executable by at least one processor to perform the method according to claim 1.

\* \* \* \* \*